(12) United States Patent
Carlei

(10) Patent No.: US 10,309,116 B2
(45) Date of Patent: Jun. 4, 2019

(54) DEVICE FOR LIFTING AND TRANSPORTING SHEET MATERIAL

(71) Applicant: QUANTUM WORKHEALTH PROGRAMMES PTY LTD, Essendon (AU)

(72) Inventor: Ricardo Carlei, Essendon (AU)

(73) Assignee: QUANTUM WORKHEALTH PROGRAMMES PTY LTD, Essendon (AU)

(*) Notice: Subject to any disclaimer, the term of this patent is extended or adjusted under 35 U.S.C. 154(b) by 0 days.

(21) Appl. No.: 15/306,397

(22) PCT Filed: Apr. 24, 2015

(86) PCT No.: PCT/AU2015/050196
§ 371 (c)(1),
(2) Date: Oct. 24, 2016

(87) PCT Pub. No.: WO2015/161349
PCT Pub. Date: Oct. 29, 2015

(65) Prior Publication Data
US 2017/0044782 A1 Feb. 16, 2017

(30) Foreign Application Priority Data

Apr. 24, 2014 (AU) .................................. 2014901497
Oct. 17, 2014 (AU) .................................. 2014904158

(51) Int. Cl.
*E04G 21/16* (2006.01)
*B66F 9/18* (2006.01)
(Continued)

(52) U.S. Cl.
CPC .............. *E04G 21/168* (2013.01); *B62B 3/02* (2013.01); *B62B 3/04* (2013.01); *B62B 3/108* (2013.01);
(Continued)

(58) Field of Classification Search
CPC ....... E04G 21/168; E04G 21/167; B62B 3/02; B62B 3/04; B62B 3/108; B62B 2202/00;
(Continued)

(56) References Cited

U.S. PATENT DOCUMENTS 2,516,269 A * 7/1950 Schildmeier ............ F16D 13/08
192/415
3,221,900 A * 12/1965 Love .................... E04F 21/1822
414/11

(Continued)

FOREIGN PATENT DOCUMENTS

CH 435668 * 5/1967
CN 102107780 A 6/2011
(Continued)

OTHER PUBLICATIONS

GGR Group, GlasMax - Manual Hoist Great for Lifting Glass, <https://www.youtube.com/watch?v=YyyUqNj26D4>, May 18, 2011.*
(Continued)

*Primary Examiner* — Lynn E Schwenning
(74) *Attorney, Agent, or Firm* — Harness, Dickey & Pierce, P.L.C.

(57) ABSTRACT

A device for lifting and transporting sheet material includes a base portion; wheels on which the base portion is supported; a mast that extends upwardly from the base portion; a boom that extends from a first end outwardly from the mast to a second end; a supporting head that is configured to support sheet material; and a pivot coupling at the second end of the boom. The pivot coupling is arranged to couple the supporting head to the boom, and enable the supporting head to be rotated about a pivot axis between a first position in which sheet material supported by the supporting head is in a generally transverse orientation relative to the boom, and a second position in which the angle between sheet
(Continued)

material supported by the supporting head and the boom is reduced.

21 Claims, 23 Drawing Sheets

(51) Int. Cl.
    *B62B 3/02*     (2006.01)
    *B62B 3/04*     (2006.01)
    *B62B 3/10*     (2006.01)
    *B66D 3/02*     (2006.01)
    *B66F 9/08*     (2006.01)
    *B66F 9/14*     (2006.01)

(52) U.S. Cl.
    CPC ............... *B66D 3/02* (2013.01); *B66F 9/087* (2013.01); *B66F 9/14* (2013.01); *B66F 9/181* (2013.01); *B62B 2202/00* (2013.01); *B62B 2203/30* (2013.01); *B62B 2206/06* (2013.01)

(58) Field of Classification Search
    CPC ... B62B 2203/30; B62B 2206/06; B66D 3/02; B66F 9/087; B66F 9/14; B66F 9/181
    USPC ............................................... 414/10–12, 23
    See application file for complete search history.

(56) References Cited

U.S. PATENT DOCUMENTS

| | | | | |
|---|---|---|---|---|
| 3,598,263 A * | 8/1971 | Ehmke | ................ | B65G 49/067 294/65 |
| 3,630,389 A * | 12/1971 | Schmidt | ................ | B25J 3/04 414/4 |
| 3,765,550 A | 10/1973 | Tausheck | | |
| 3,895,721 A * | 7/1975 | Russell | ................ | B62B 3/108 414/10 |
| 4,120,484 A * | 10/1978 | Zimmer | ................ | E04F 21/1811 254/6 C |
| 4,620,693 A * | 11/1986 | Vialars | ................ | E04H 12/34 254/335 |
| 4,676,713 A | 6/1987 | Voelpel | | |
| 5,259,721 A * | 11/1993 | Sato | ................ | B66F 9/061 180/211 |
| 5,315,795 A * | 5/1994 | Chae | ................ | B66F 11/00 343/874 |
| 5,642,975 A * | 7/1997 | Epstein | ................ | B65G 49/061 414/11 |
| 6,244,810 B1 * | 6/2001 | Reyes | ................ | E04F 21/1811 254/4 C |
| 6,773,222 B1 * | 8/2004 | Gilchrist | ................ | B60B 29/002 414/426 |
| 7,267,516 B1 * | 9/2007 | Sorensen | ................ | B66F 9/16 414/23 |
| 7,448,598 B1 * | 11/2008 | Elmlinger | ................ | B66D 1/28 254/338 |
| 7,766,596 B2 * | 8/2010 | Smith | ................ | B66F 9/0655 294/65 |
| 2011/0264306 A1 * | 10/2011 | Bagge | ................ | B66C 23/72 701/2 |
| 2012/0321416 A1 * | 12/2012 | Nobles | ................ | B66C 1/18 414/23 |
| 2013/0269285 A1 * | 10/2013 | Hovenier | ................ | E04G 21/167 52/745.11 |

FOREIGN PATENT DOCUMENTS

| | | | |
|---|---|---|---|
| DE | 202012104180 U1 | | 11/2012 |
| FR | 2756549 A1 | | 6/1998 |
| FR | 2828875 A1 | | 2/2003 |
| FR | 2896784 A1 | | 8/2007 |
| FR | 2941687 | * | 8/2010 |
| FR | 2973360 A1 | | 10/2012 |
| WO | WO-1999019583 A1 | | 4/1999 |

OTHER PUBLICATIONS

GGR Glass Group, Lifting Solutions - Glasmax 250 Lifting Solutions Glazing Hoist, <https://www.ggrglass.co.uk/media/custom/upload/File-1383229092.pdf>, Mar. 28, 2013.*
Rick Carlei, Quattrolifts express training video, <https://www.youtube.com/watch?v=sYdPhy_ydtE>, Dec. 14, 2011.*
GGR Glass Group, Technical Specification Sheet — Giraffe Hoist, <https://www.ggrglass.co.uk/media/custom/upload/File-1383228971.pdf, Oct. 1, 2013.*
Gerhard Mayer, TePapa glass lifting EMT, <https://www.youtube.com/watch?v=L9q-0u2Fylk>, Nov. 25, 2011.*
EP Search Report in EP 15782271.9 (Year: 2017).*
SGL 7.5m Glass Hoist Brochure, Sydney Glass Lifters, <http://glasslifters.com.au/Glass%20Hoists.html>, Jan. 18, 2013 (1 page).

* cited by examiner

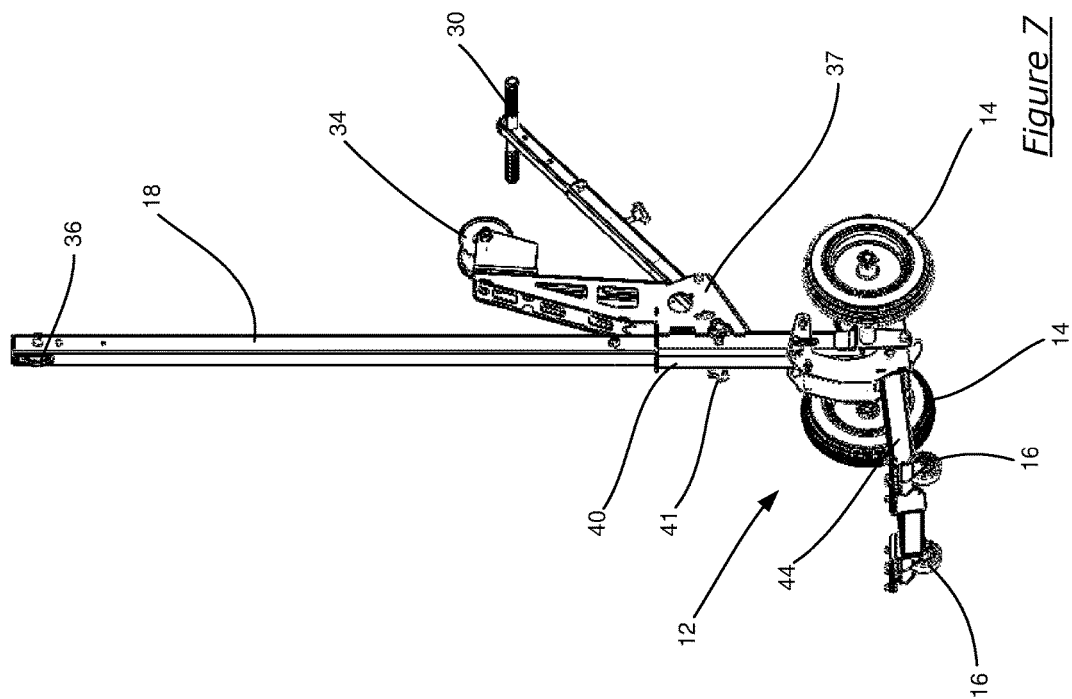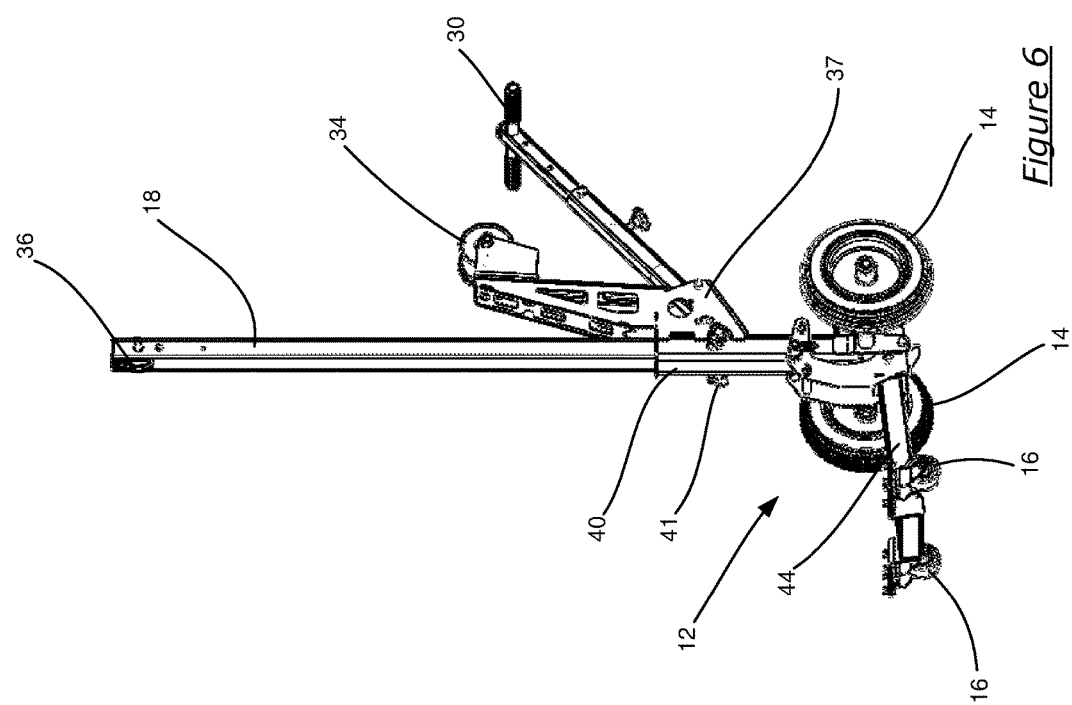

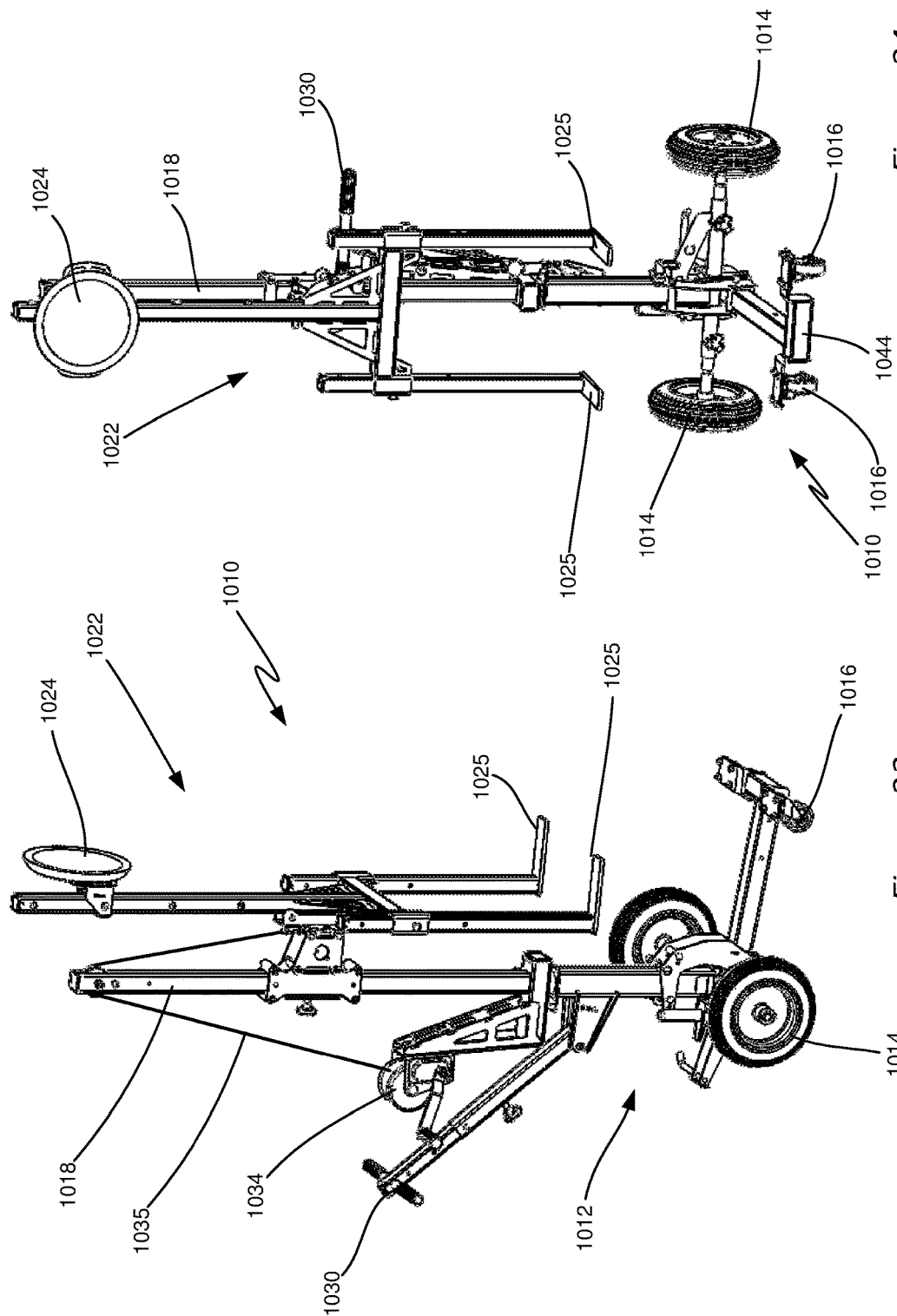

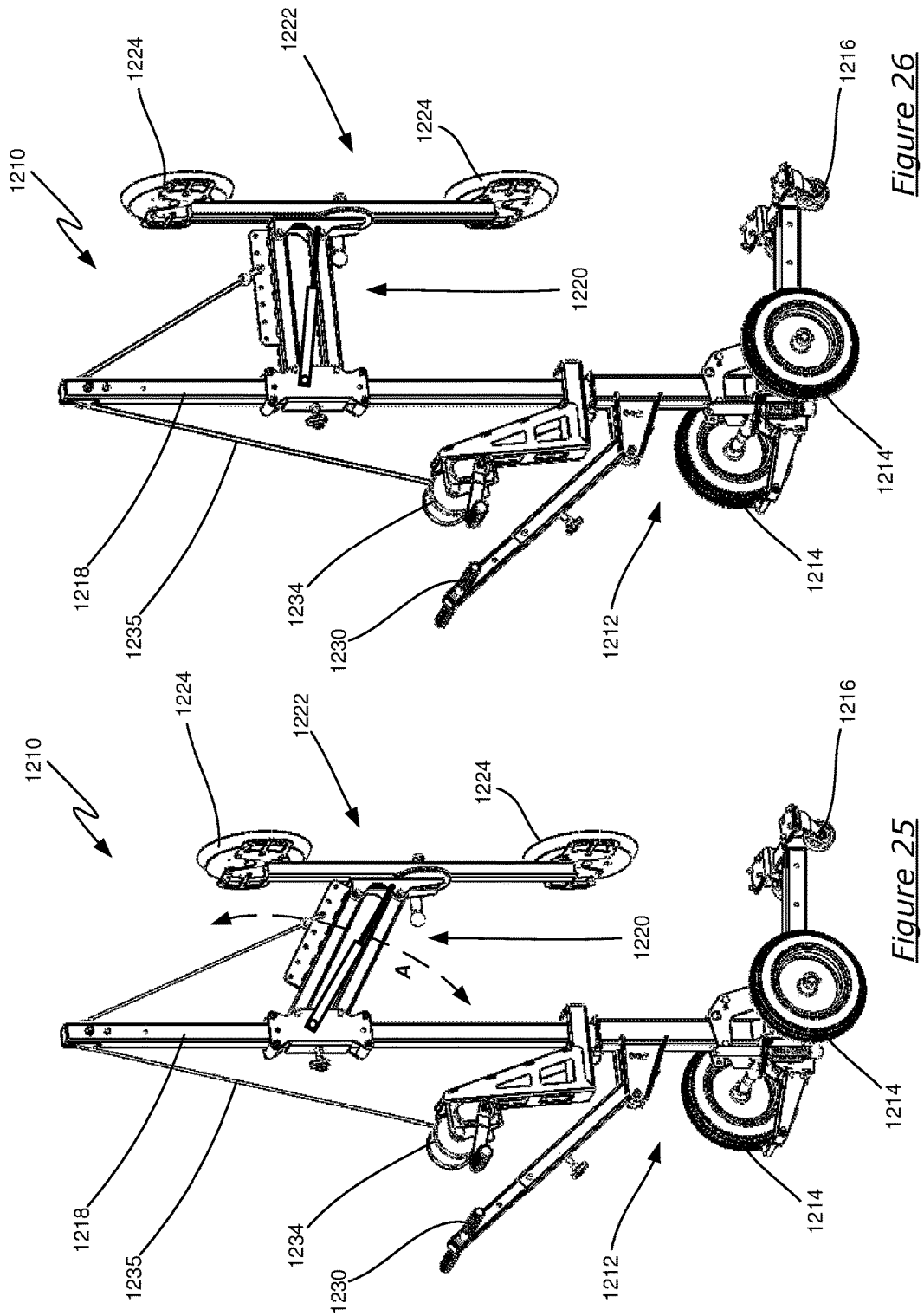

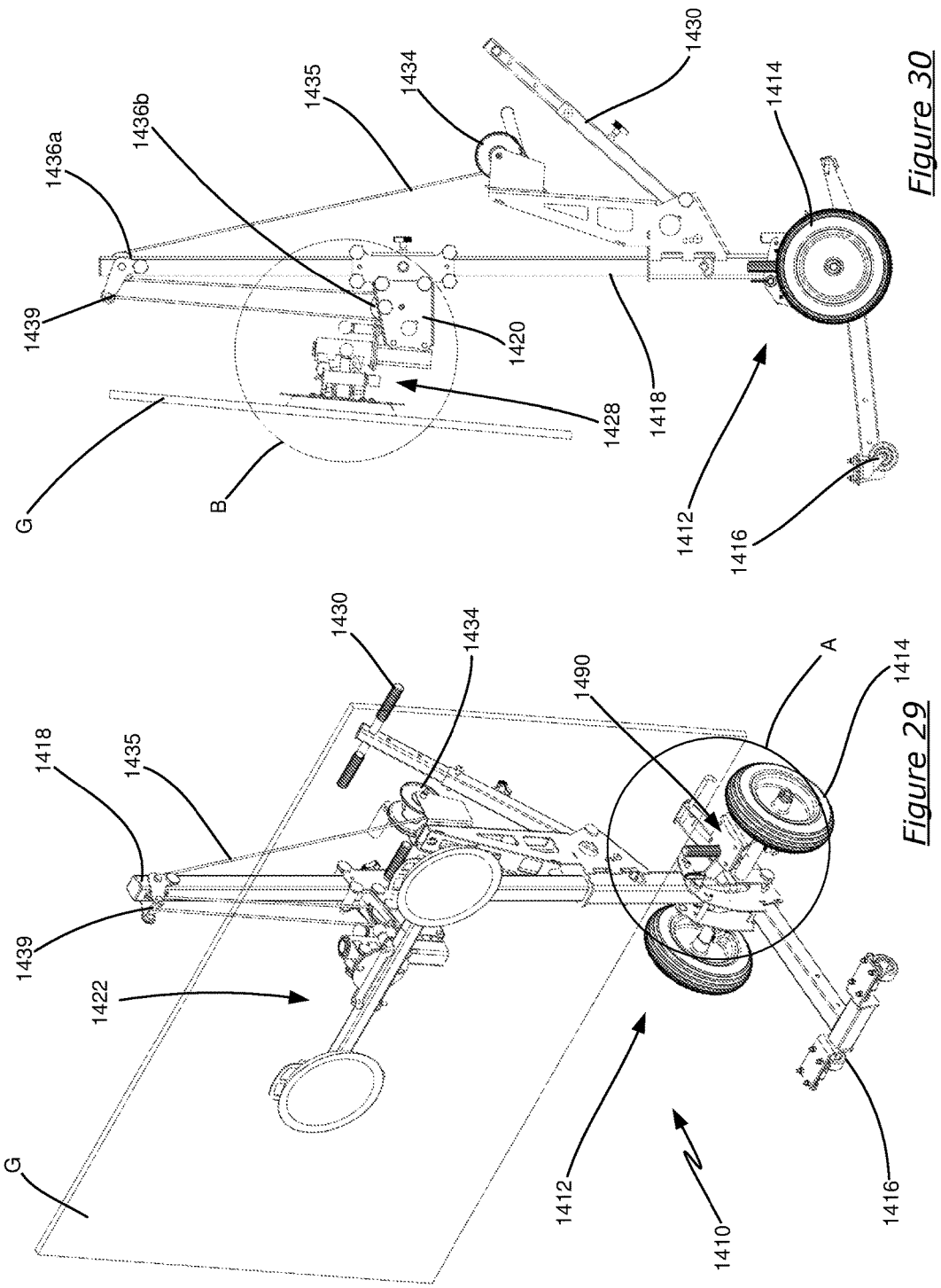

DEVICE FOR LIFTING AND TRANSPORTING SHEET MATERIAL

FIELD OF THE INVENTION

The present invention relates to a device for lifting and transporting sheet material.

BACKGROUND

Sheet materials can be difficult to handle, particularly in respect of larger sheets and/or sheets made of materials with a high density, which can be particularly heavy. Sheet materials include glass panes, plasterboard, timber boards (including engineered timber materials), doors, fibre cement sheet, and the like.

Manual handling of sheet materials is undesirable for health and safety reasons. Although various devices have been proposed to limit the manual lifting of sheet materials for transportation and installation, there are still many instances where manual handling is required. This is because many of these devices have limitations in the manner in which the sheet materials can be supported.

There is a need to address the above, and/or at least provide a useful alternative.

SUMMARY

There is provided a device for lifting and transporting sheet material, the device comprising:
  a base portion;
  wheels on which the base portion is supported, such that the base portion is movable across a surface;
  a mast that extends upwardly from the base portion;
  a boom that extends from a first end outwardly from the mast to a second end;
  a supporting head that is configured to support sheet material above the surface; and
  a pivot coupling at the second end of the boom, the pivot coupling being arranged to couple the supporting head to the boom, and enable the supporting head to be rotated about a pivot axis between a first position in which sheet material supported by the supporting head is in a generally transverse orientation relative to the boom, and a second position in which the angle between sheet material supported by the supporting head and the boom is reduced.

In some embodiments, the pivot coupling includes a pin that is attached to one of the boom and the supporting head, and a tube that is attached to the other of the supporting head and the boom, wherein the tube is rotatably supported on the pin.

In some alternative embodiments, the pivot coupling includes:
  a pair of brackets that each have one or more apertures, each bracket being mounted to a respective one of the boom and the supporting head; and
  a pin,
  wherein the apertures in the brackets are aligned and the pin passes through the aligned brackets to couple the brackets to one another.

The device can further comprise a retaining mechanism such that the supporting head can be releasably retained in the first and second positions.

The supporting head can include an inner portion that is attached to the pivot coupling, an outer portion that includes one or more elements that support the sheet material, and a rotary coupling that couples the inner and outer portions such that the outer portion is rotatable relative to the inner portion about an axis that is non-parallel to the pivot axis.

The device can further comprise a second retaining mechanism such that the outer portion can be releasably retained in one or more rotational positions relative to the inner portion.

In at least one embodiment, the pivot coupling is configured to enable the supporting head to be rotated about a generally vertical pivot axis.

In certain embodiments, the pivot coupling is a first pivot coupling and the device further comprises a second pivot coupling arranged between the first pivot coupling and the supporting head, and second pivot coupling being configured to enable the supporting head to be tilted about an axis that is generally transverse to the generally vertical pivot axis between an upright position in which sheet material supported by the supporting head is generally vertical, and a tilted position in which sheet material supported by the supporting head is reclined relative to the upright position.

In the tilted position, the bottom edge of sheet material supported by the supporting head is further from the mast than the top edge.

The second pivot coupling can include a first bracket that is fixedly attached to the tube of the first pivot coupling, and a second bracket that is attached to the supporting head.

The device can further comprise a third retaining mechanism that is associated with the second pivot coupling, and is configured to enable the supporting head to be releasably retained in either or both of the upright or tilted positions.

The base portion can include a mast step that supports the mast. In some embodiments, the mast step is a mast sleeve into which the bottom end of the mast is retained.

The mast may be movable relative to the mast sleeve between a lowered position and a raised position. The mast is associated with the mast sleeve in a telescoping arrangement. Alternatively or additionally, the mast can include two or more telescoping sections.

In some embodiments, the mast can be secured in each of the lowered and raised positions. The mast sleeve can include one or more through holes, and the mast can include upper and lower holes, wherein each of the upper and lower holes can be aligned with the through holes, and a pin passed through the aligned holes to secure the mast relative to the mast sleeve.

In some embodiments, the device includes a mechanism to facilitate moving the mast between the lowered and raised positions. In some examples, the mechanism includes a gas strut that extends between mast sleeve and the mast, and provides an upward biasing force to the mast.

In some alternative examples, the mechanism includes a gear set and a threaded shaft that extends between the mast sleeve and the mast, wherein the gear set can be driven to rotate the threaded shaft, which causes the mast to move between the lowered and raised positions. Preferably, the gear set includes an input. In one form, the device includes a winding handle that is connected or connectable to the input. Alternatively, the input is shaped to connect to a fitting of a powered tool that provides rotary motion as an output.

The device can further include a carriage to which the first end of the boom is mounted, the carriage being configured to be slidable along the mast. The device can further include a lifting mechanism to provide vertical support to the boom along the mast.

In some embodiments, the lifting mechanism includes a winch, and a cable that is connected to the winch, extends over a pulley located at or near the upper end of the mast, and is secured or securable to the boom.

In some alternative embodiments, the lifting mechanism includes a winch, and a cable that is connected to the winch, passes over a first pulley located at or near the upper end of the mast and under a second pulley that is supported by the boom, and is secured or securable at or adjacent an upper end of the mast.

The winch can be mounted on the base portion.

The base portion of the device can further comprise a secondary support disposed between one of the rear wheels, and the mast, whereby, when the supporting head is in the second position, sheet material supported by the supporting head can also be supported on the secondary support.

In certain embodiments, the boom includes a slide mechanism between the inner and outer ends, such that the length of the boom is adjustable. The slide mechanism is arranged such the outer end can be moved between an inward position and an outward position. In such embodiments, the boom can include an inner, fixed portion, and an outer movable portion, and the slide mechanism is disposed between the fixed and movable portions.

The slide mechanism can include guides that are mounted on the fixed portion, and one or more rails to which the movable portion is secured, wherein the rails can slide through the guides to facilitate the movement of the movable portion.

The boom can be inclined such that the outer end is either above or below the first end. In such embodiments, the boom can be secured in a first position in which the outer end is above the first end, and in a second position in which the outer end is below the first end.

In some alternative embodiments, the boom includes a parallelogram linkage between the inner and outer ends, such that the outer end can be moved along an arc that is centred on the inner end.

The device can further include a side shift mechanism disposed between the mast and the inner end of the boom or the supporting head, the side shift mechanism being arranged to move the supporting head in a direction that is transverse to the longitudinal direction of the mast and/or the longitudinal direction of the boom.

In some embodiments, the wheels of the device include a first wheel set that supports the base portion at the bottom end of the mast sleeve, the first wheel set including at least one wheel to each side of the mast.

In at least one embodiment, the first wheel set includes one wheel to each side of the mast, and the wheels of the first wheel set are rotatable about a common axis. In at least one other embodiment, the first wheel set includes three wheels to each side of the mast sleeve that are arranged in a tri-star wheel configuration. In at least one other embodiment, the wheels of the first wheel set are castor wheels.

The base portion can further include an arm that is secured or securable at one end adjacent the bottom end of the mast sleeve, and the wheels of the device can further include a second wheel set, which includes one or more wheels that are supported by the arm at a position that is spaced from the mast sleeve. The wheels of the second wheel set can be castor wheels.

Preferably, the base portion includes a second sleeve, and the arm can be releasably secured in the second sleeve.

The base portion can be arranged such that the arm projects in the same direction as the boom. Alternatively or additionally, the base portion can be arranged such that the arm projects in the opposite direction to the boom.

In embodiments in which the base portion can be arranged with the arm projecting in the opposite direction to the boom, the arm can include a support on which one or more counterweights can be retained. In one form, the counterweights can be discs that each have a central aperture, and the support can be in the form of a post.

BRIEF DESCRIPTION OF THE DRAWINGS

In order that the invention may be more easily understood, embodiments will now be described, by way of example only, with reference to the accompanying drawings, in which:

FIG. 6: is a partial perspective view of the device of FIG. 1, showing the mast in a lowered position;

FIG. 7: is a partial perspective view of the device of FIG. 1, showing the mast in a raised position;

FIGS. 23 and 24: are perspective views of a device for lifting and transporting sheet material according to an eleventh embodiment of the present invention;

FIGS. 25 and 26: are perspective views of a device for lifting and transporting sheet material according to a twelfth embodiment of the present invention;

FIG. 29: is a perspective view of a device for lifting and transporting sheet material according to a fourteenth embodiment of the present invention;

FIG. 30: is a left side view of the device of FIG. 29;

DETAILED DESCRIPTION

Figure 1:
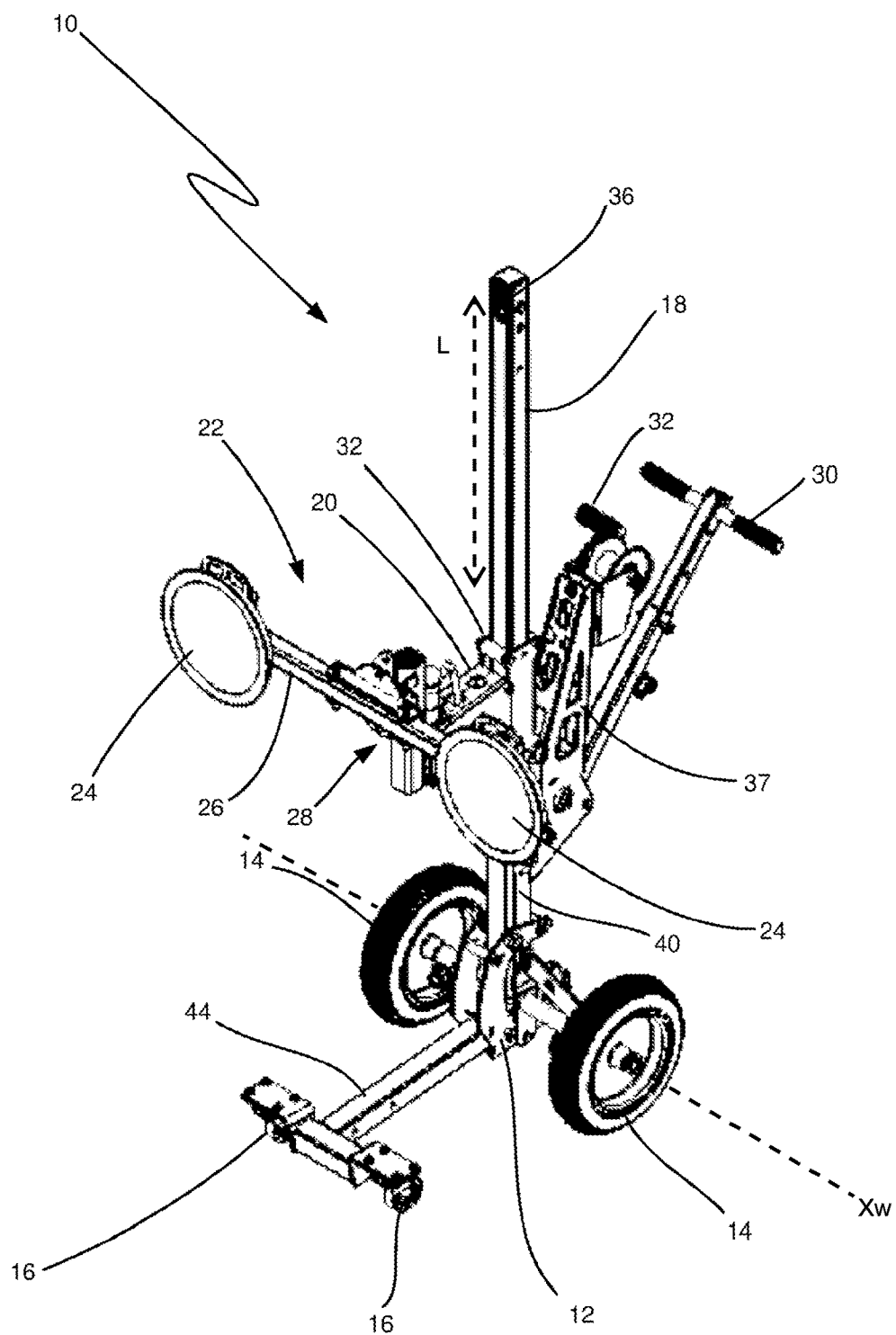
FIG. 1: is a perspective view of a device for lifting and transporting sheet material, the device being in accordance with a first embodiment of the present invention.

FIGS. 1 to 8 show a device 10 according to a first embodiment of the present invention. The device 10 is intended for use in lifting and transporting sheet material, such as a glass pane. The device 10 includes a base portion 12, and wheels 14, 16 on which the base portion 12 is supported. The wheels 14, 16 enable the base portion 12, and thus the device 10, to be moved across a surface. The device 10 includes a mast 18 that extends upwardly from the base portion 12, and a boom 20 that extends from a first (inner) end outwardly from the mast 18 to a second (outer) end.

A supporting head 22 is configured to support the glass pane above the surface. To this end, in this particular embodiment, the supporting head 22 has two vacuum grips 24 at opposing ends of a cross beam 26. A pivot coupling 28 couples the supporting head 22 to the boom 20 at the second end of the boom 20.

Figure 2:
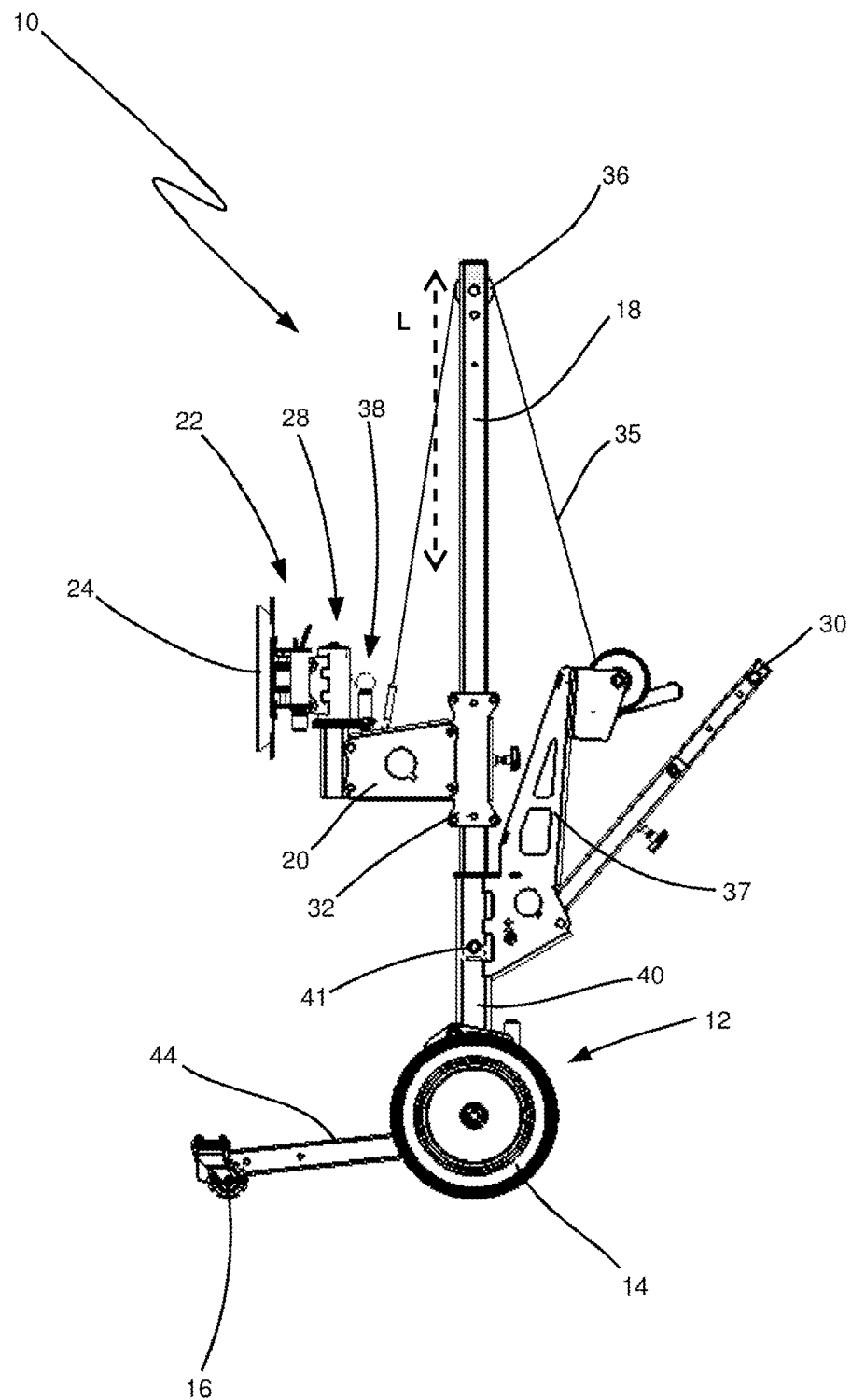
FIG. 2: is a left side view of the device of FIG. 1.
Figure 3:
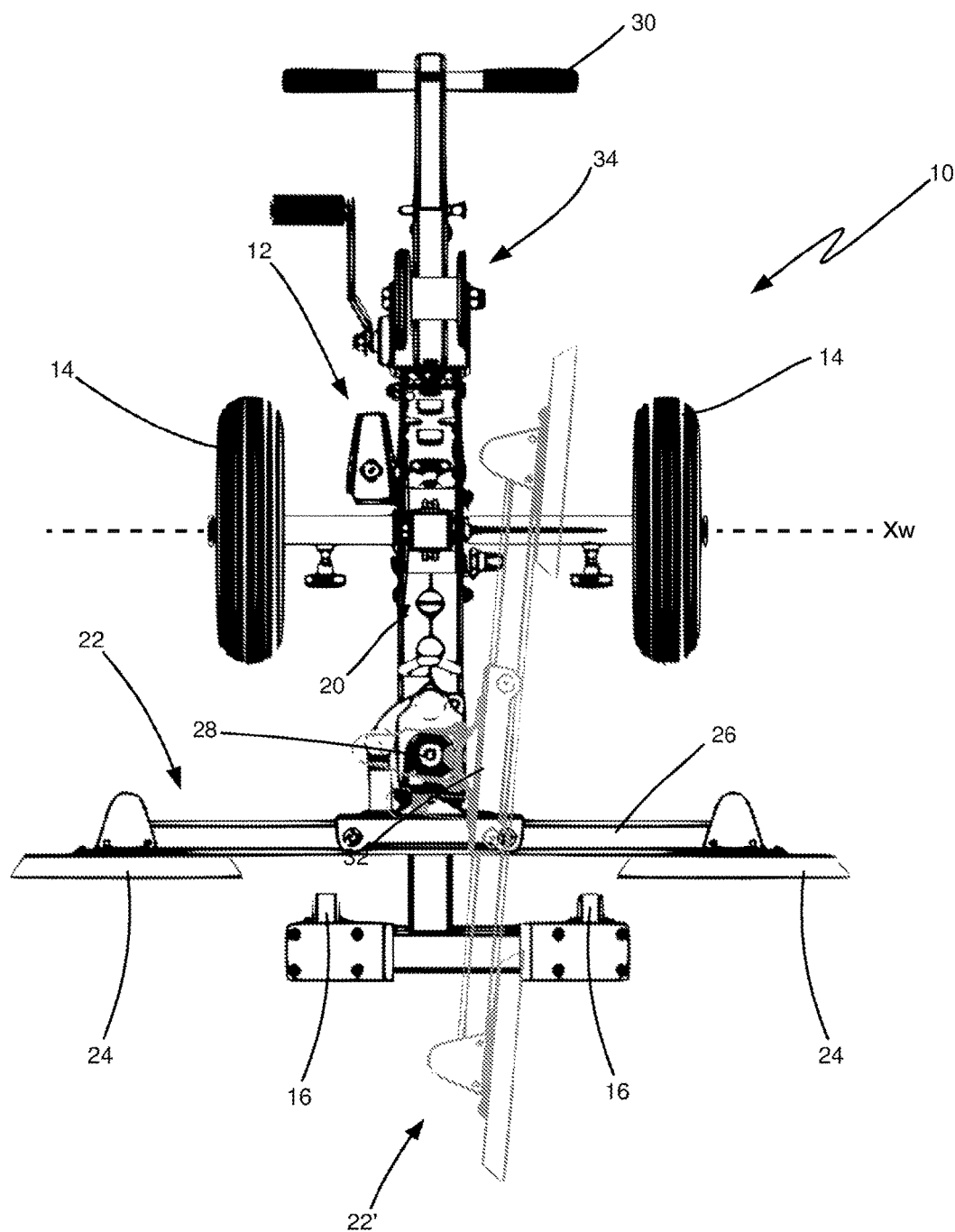
FIG. 3: is a top view of the device of FIG. 1.
Figure 4:
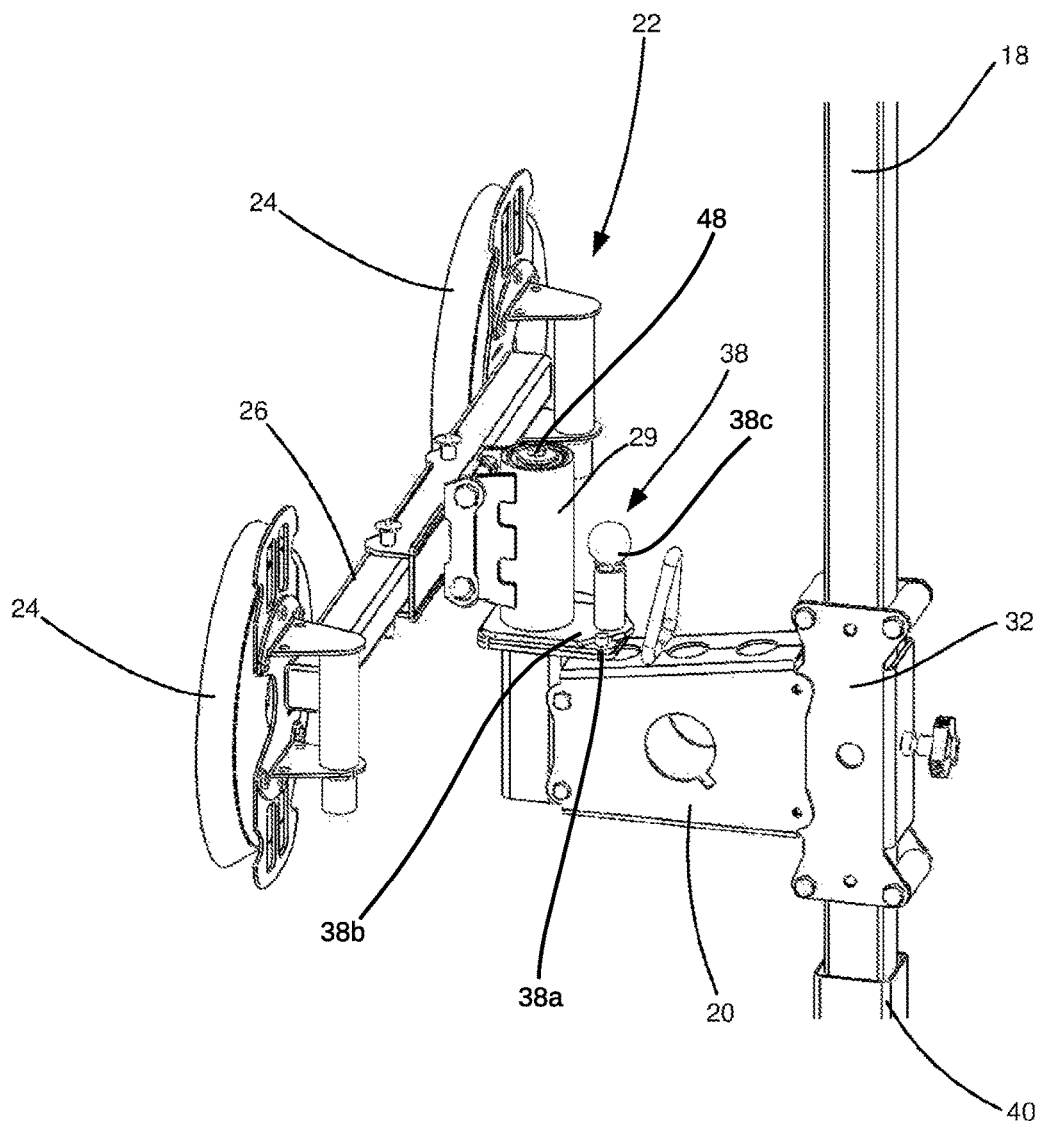
FIG. 4: is an enlarged perspective view of the carriage, boom and supporting head of the device of FIG. 1.
Figure 5:
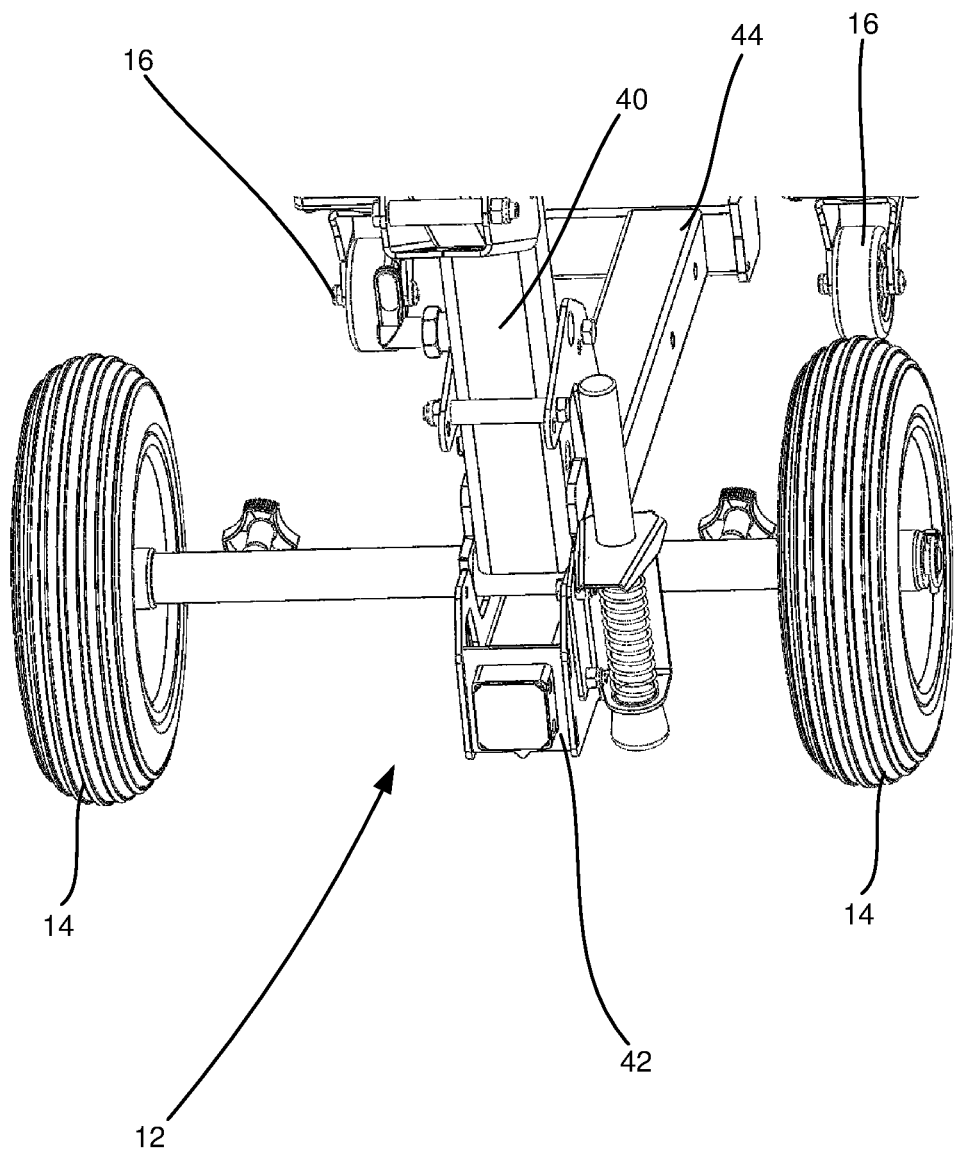
FIG. 5: is a rear perspective view of a lower portion of the device of FIG. 1.

The pivot coupling 28 enables the supporting head 22 to be rotated about a pivot axis between a first position in which glass pane supported by the supporting head 22 in a generally transverse orientation relative to the boom 20, and a second position in which the angle between glass pane supported by the supporting head 22 and the boom 20 is reduced, relative to that of the first position. FIGS. 1, 2 and 4 show the supporting head 22 in the first position. FIG. 3 shows the supporting head 22 in heavy lines in the first position, and also shows the supporting head (indicated by reference numeral 22') in lighter weight lines in the second position.

The device 10 also includes a handle assembly 30 that is, in this embodiment, connectable to the base portion 12, as will be described in further detail below. By way of example, in use of the device 10, an operator can place the supporting head 22 in the first position and move the device 10 using the handle assembly 30, for instance up to a glass pane that is on the glass rack of a vehicle. The glass pane can be retained to the vacuum grips 24, and then removed from the glass rack.

The glass pane may be wider than the maximum width of the device 10, which in this embodiment is the wheel track of the wheels 14. The supporting head 22 can be placed in the second position, which rotates the supporting head 22 with the glass pane about the pivot axis. In this configuration, the glass pane is between the wheels 14, and the device 10 carrying the glass pane can be moved through a narrow opening.

As will be appreciated, the centre of mass of the glass pane moves as the supporting head 22 moves between the first and second positions. Having the supporting head 22 rotate about a pivot axis that is at the end of the boom 20 has the advantage of minimizing the distance that the centre of mass of the glass pane moves, which minimizes the instability of the device 10 during this movement. Furthermore, as will be appreciated from FIG. 3, in most instances a glass pane can be carried by the device 10 with the supporting head 22 in either the first or second positions, whilst keeping the centre of mass of the glass pane between the wheels 14.

The device 10 includes a carriage 32 to which the first end of the boom 20 is mounted. The carriage 32 is be slidable along the mast 18 in the longitudinal direction L of the mast 18. A lifting mechanism provides vertical support to the boom 20, the lifting mechanism includes a winch 34, and a cable 35 (shown only in FIG. 2) that is wound onto the winch 34. The cable 35 extends over a pulley 36 located at or near the upper end of the mast 18, and is secured to the boom 20. The base portion 12 includes a bracket 37 on which the winch 34 is mounted.

In this particular embodiment, the pivot 28 includes a pin 48 that is attached to the boom 20, and a tube 29 that is attached to the supporting head 22. The tube 29 is rotatably supported on the pin 48. To this end, roller bearings can be inserted between the pin 48 and tube 29 to facilitate rotation of the tube 29 about the pin 48.

A retaining mechanism 38 is associated with the pivot 28 such that the supporting head 22 can be releasably retained in the first and second positions. In this particular embodiment, the retaining mechanism 38 includes a first plate 38a that is fixedly attached to the boom 20 adjacent the pivot, a second plate 38b that is fixedly attached to the tube 29, and a drop pin 38c that moves with tube 29. The first plate 38a has two holes; when the supporting head 22 is in either of the first and second positions, the drop pin 38c can be passed through a respective one of the holes in the first plate 38a.

The base portion 12 includes a sleeve 40 into which the bottom end of the mast 18 is retained. As is apparent from FIGS. 6 and 7, the mast 18 is movable relative to the sleeve 40 between a lowered position (shown in FIG. 6) and a raised position (shown in FIG. 7). The mast 18 can be secured in each of the lowered and raised positions. To this end, the sleeve 40 has a pair of through holes, and the mast 18 includes upper and lower pairs of holes. When the mast 18 is in the lowered position, the upper holes align with the through holes, and a pin 41 passed through the aligned holes to secure the mast 18 relative to the sleeve 40. Similarly, when the mast 18 is in the raised position, the lower holes align with the through holes, and a pin 41 passed through the aligned holes to secure the mast 18 relative to the sleeve 40.

Figure 8:
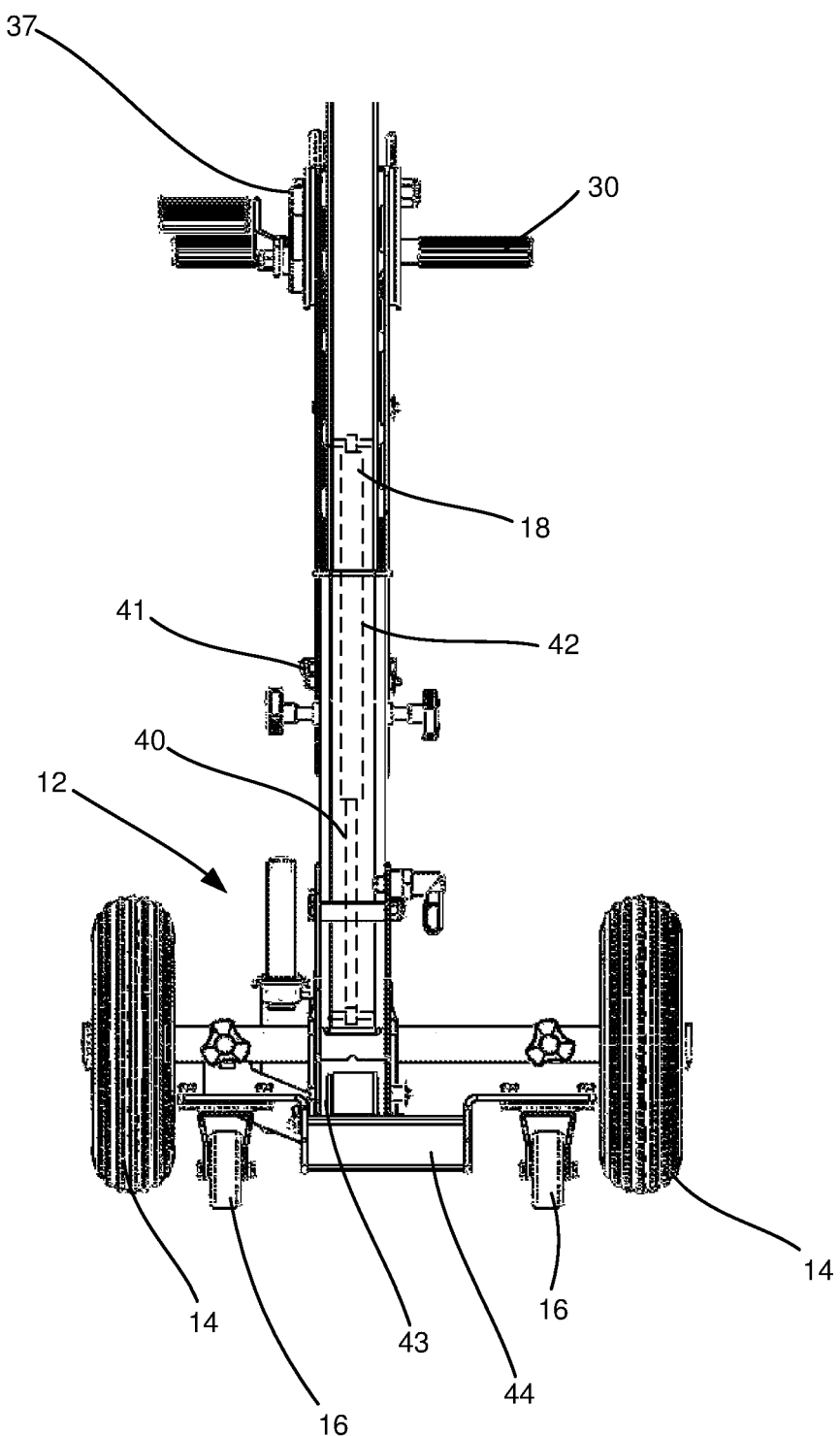
FIG. 8: is a partial front view of the device of FIG. 1.
Figure 9:
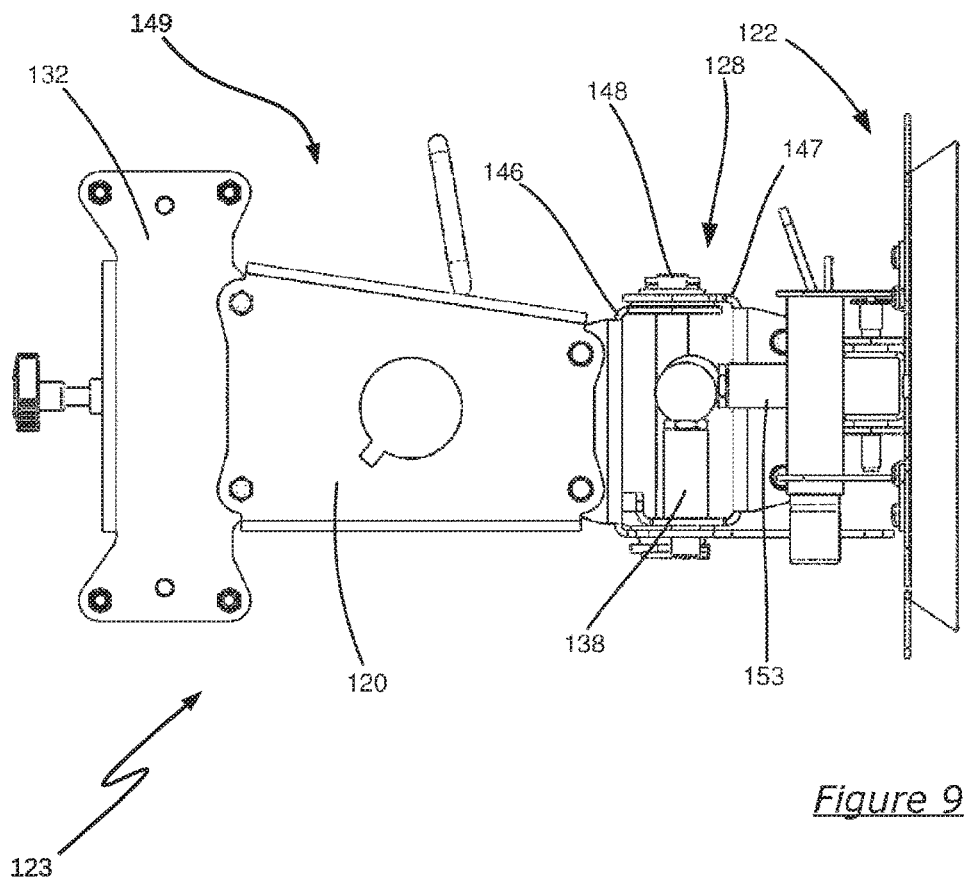
FIG. 9: is a right side view of an assembly which includes a carriage, boom and supporting head, the assembly part of a device according to second embodiment of the present invention.
Figure 10:
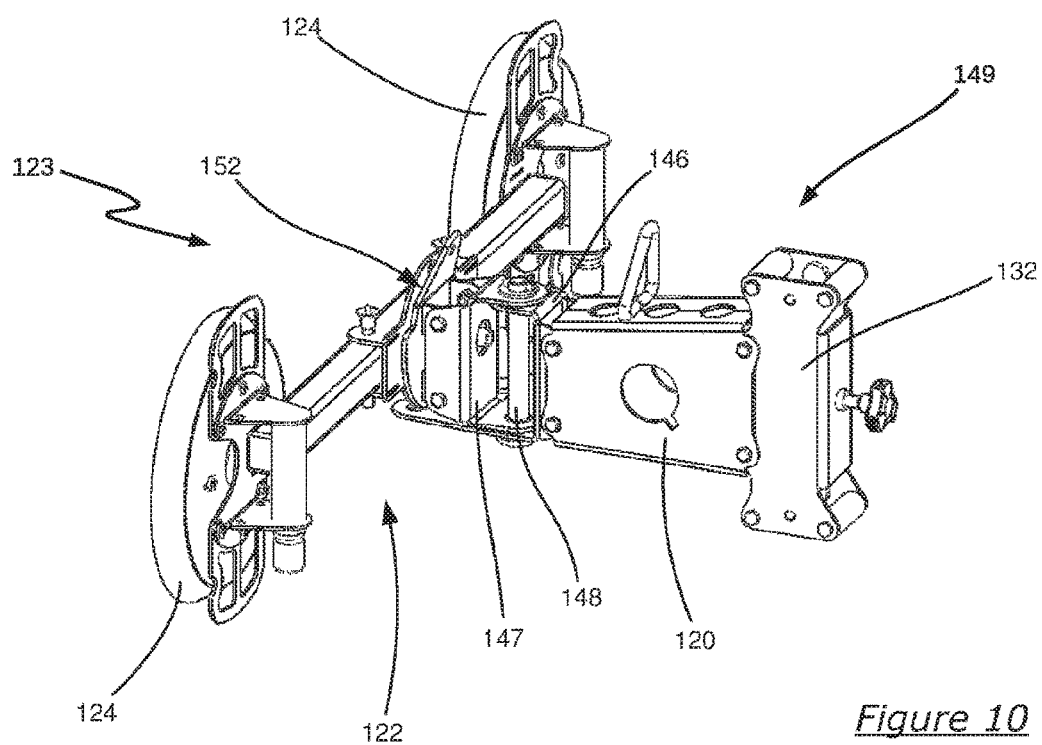
FIG. 10: is a left perspective view of the assembly of FIG. 9.
Figure 11:
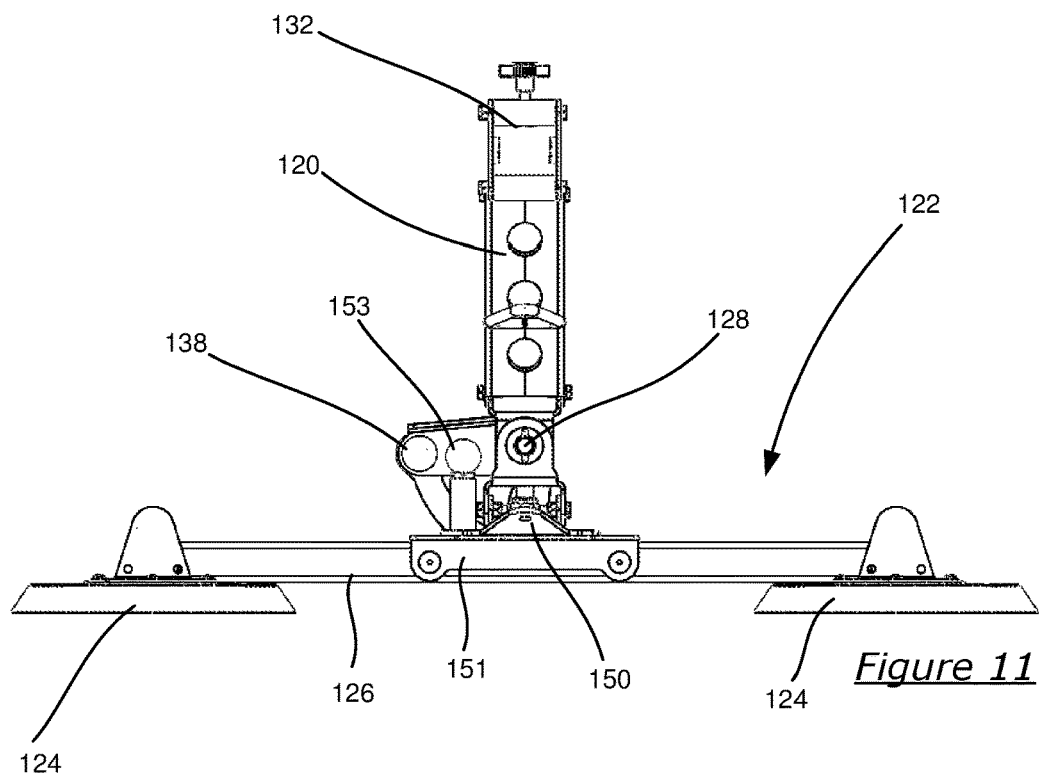
FIG. 11: is a top view of the assembly of FIG. 9, showing the supporting head in a first position.
Figure 12:
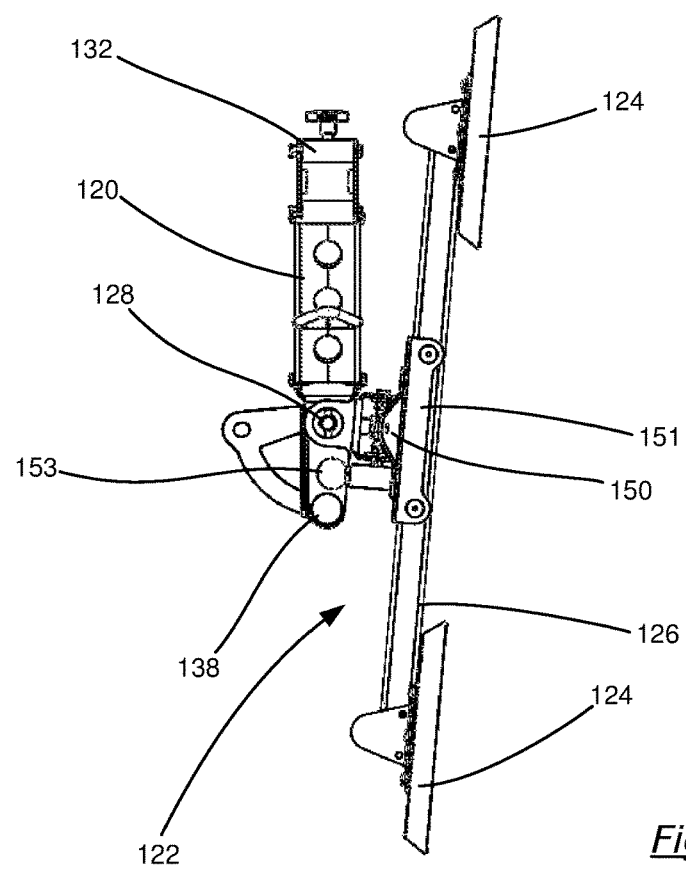
FIG. 12: is a top view of the assembly of FIG. 9, showing the supporting head in a second position.
Figure 13:
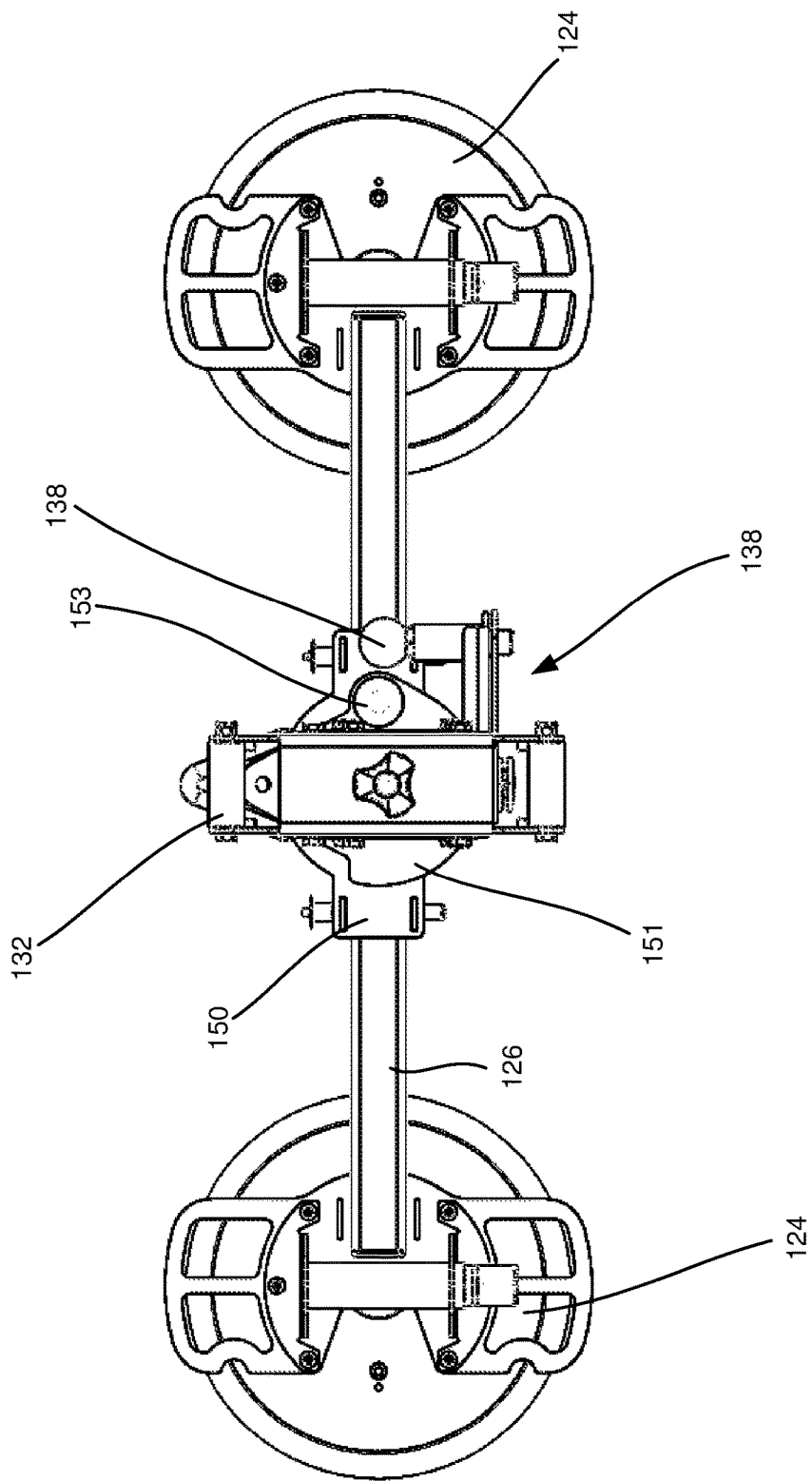
FIG. 13: is a rear view of the assembly of FIG. 9.

FIG. 8 shows the lower portion of the device 10, including the base 12, the sleeve 40 and the lower portion of the mast 18. As can be seen from FIG. 8, internally of the sleeve 40 and the mast 18, the device 10 includes a gas strut 42 (shown in broken lines) that extends between the sleeve 40 and the mast 18. The gas strut 42 provides an upward biasing force to the mast 18, which reduces the force required to raise the mast 18 into the raised position. The gas strut 42 is mounted internally of the mast 18 and sleeve 40.

Wheels 14 form a first wheel set that supports the base portion 12 at the bottom end of the sleeve 40, and there is one wheel 14 to each side of the mast 18. As will be evident from FIGS. 3, 5 and 7, the sleeve 40 is offset relative to the wheels 14, such that the mast 18 is horizontally closer to one of the wheels 14 than the other. The wheel 14 that has the greater separation from the sleeve 40 is on the same side as the supporting head 22 is when in the second position. The wheels 14 are independently rotatable about a common axis Xw.

The base portion 12 further includes a second sleeve 43, within which an arm, which in this embodiment is the form of a T-shaped member 44, is securable such that one end of the arm 44 is adjacent the bottom end of the mast sleeve 40. Wheels 16, which form a second wheel set, are mounted at the outer end of the T-shaped member 44. Thus, the wheels 16 are supported by the T-shaped member 44 at a position that is spaced from the mast sleeve 40, and also the second sleeve 44.

In the configuration of this particular embodiment, as illustrated in FIGS. 1 to 8, the T-shaped member 44 projects from the base portion 12 in the same direction as the boom 20.

FIGS. 9 to 13 show and assembly 123 of a device according to a second embodiment of the present invention, the assembly 123 displaceable along the mast (not shown in FIGS. 9 to 13) of the device. The components shown in FIGS. 9 to 13 are substantially similar to those of the device 10 of FIG. 1. In FIGS. 9 to 13, the components that are substantially similar to those of the device 10 have the same reference numeral with the prefix "1".

The assembly 123 includes a supporting head 122 that is configured to support sheet material above the surface, and a carriage sub-assembly 149 that guides movement of the assembly 123 along the mast of the device. The carriage sub-assembly 149 includes a pivot coupling 128 that couples the supporting head 122 to the carriage sub-assembly 149.

In this particular embodiment, the carriage sub-assembly 149 includes a boom 120 to which the pivot coupling 128 is connected. The boom 120 spaces the pivot coupling 128 from the mast. The carriage sub-assembly 149 further includes a carriage on which the boom 120 is mounted.

The pivot coupling 128 has a substantially similar function to the pivot 28 of the device 10, but incorporates a different mechanism. As shown most clearly in FIGS. 9 and 10, the pivot 128 includes a pair of brackets 146, 147 that each have two parallel end sections joined by a web. Bracket 146 is mounted to the outer end of the boom 120, and bracket 147 is mounted to the supporting head 122. The end sections of each bracket 146, 147 has apertures (not shown), and the brackets 146, 147 are arranged such that the apertures in the brackets are aligned. A pin 148 passes through the aligned apertures to couple the brackets 146, 147 to one another. The brackets 146, 147 can be rotated relative to one another about an axis defined by the pin 148.

In this embodiment, the supporting head 122 also has an inner portion 150 that is attached to bracket 147 of the pivot coupling 128, an outer portion 151 that includes the cross beam 126 and the vacuum grips 124 for supporting the sheet material, and a rotary coupling 152 that couples the inner and outer portions 150, 151 such that the outer portion 151 is rotatable relative to the inner portion 150 about a rotational axis that is non-parallel to the pivot axis. In this embodiment, the rotational axis is generally orthogonal to the pivot axis.

The supporting head 122 also has a second retaining mechanism 153 associated with rotary coupling 152 such that the outer portion 151 can be releasably retained in one or more rotational positions relative to the inner portion 150. The second retaining mechanism 153 includes a first plate that is fixedly attached to the inner portion 150 adjacent the rotary coupling 152, a second plate that is fixedly attached to the outer portion 151, and a drop pin. The first plate has a hole for each of the rotational positions in which the outer portion 151 can be retained, and the drop pin can be passed through the respective hole in the first plate to retain the outer portion 151 in a position relative to the inner portion 150.

Figure 14:
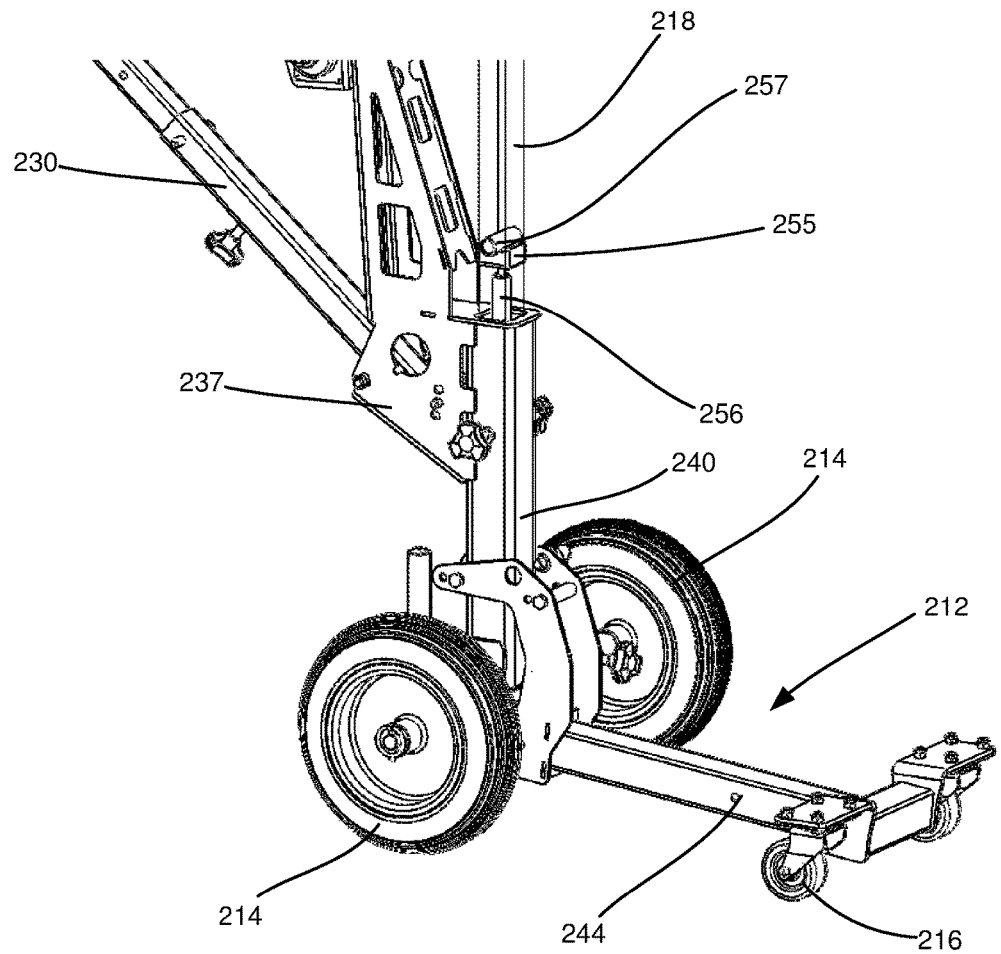
FIG. 14: is a perspective view of a device according to a third embodiment of the present invention.

FIG. 14 shows a lower section of a device 210 according to a third embodiment of the present invention. The device 210 is substantially similar to the device 10 of FIG. 1. In FIG. 14, the features of the device 210 that are substantially similar to those of the device 10 have the same reference numeral with the prefix "2".

The mast 218 is movable relative to the sleeve 240 between a lowered position and a raised position in the same manner as illustrated in FIGS. 6 and 7, in connection with the device 10. FIG. 14 shows the device 210 with the sleeve 240 and mast 218 transparent. Internally of the sleeve 240 and the mast 218, the device 210 a gear set 255 and a threaded shaft 256 that extends between the mast sleeve 240 and the mast 218. The gear set 255 can be driven to rotate the threaded shaft 256, which causes the mast 218 to move between the lowered and raised positions. In view of FIG. 14, the mast 218 is shown in a transparent form such that the configuration of the gear set 255 and treaded shaft 256 are apparent.

The mast 218 includes an aperture 257 through which a drive socket (not shown) is accessible to provide an input to the gear set 255. A powered tool, such as a cordless drill with an appropriate drive fitting attachment, can be connected to the socket, and operated to effect movement of the mast 218 between the lowered and raised positions. Alternatively, the device 210 can include a winding handle that is connected or connectable via a drive fitting to the input of the gear set.

Figure 15:
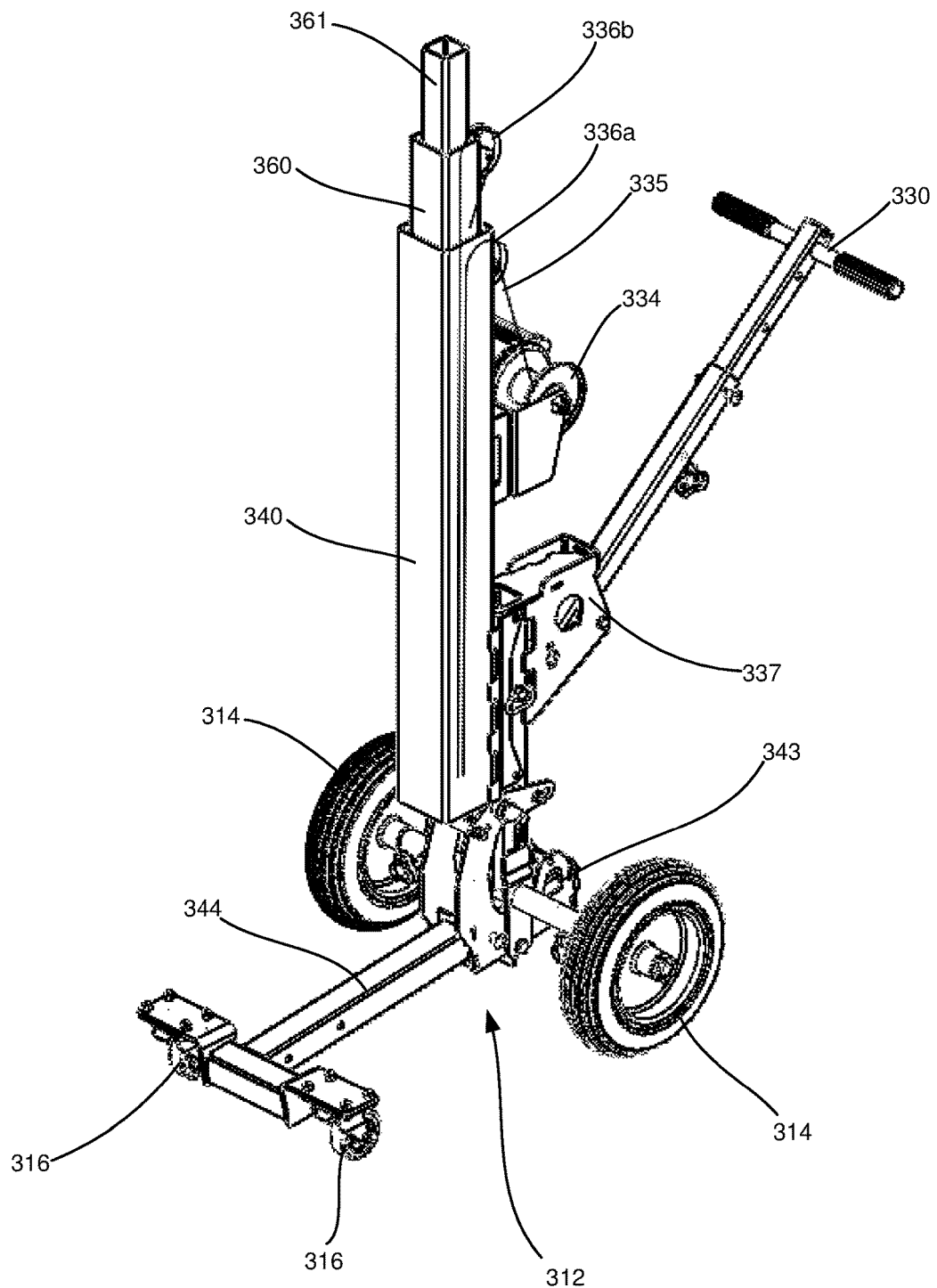
FIG. 15: is a partial view of a device according to a fourth embodiment of the present invention.

FIG. 15 shows a device 310 according to a fourth embodiment of the present invention. The device 310 is substantially similar to the device 10 of FIG. 1. In FIG. 15, the features of the device 310 that are substantially similar to those of the device 10 have the same reference numeral with the prefix "3". The boom and supporting head of the device 310 are omitted from FIG. 15 for clarity.

The mast 318 includes a lower portion 360 that is slidably disposed in the mast sleeve 340, and an upper portion 361 that is slidably disposed in the lower portion 360. The boom (not shown) is to be mounted on the upper portion 361. As will be appreciated, the mast 318 is associated with the mast sleeve 340 in a telescoping arrangement. Accordingly, the upper portion 361 of the mast 318 can be moved between a lowered position (shown in FIG. 15), and a raised position. The boom can be fixed to the upper portion 361, and the supporting head (and any sheet material secured thereto) can be raised and lowered by adjusting the length of the mast 318.

The device 310 includes a lifting mechanism operates on the mast 318 to move the mast 318 between the lowered and raised positions, and to retain the mast 318 in a desired telescoping arrangement. The lifting mechanism includes a winch 334, and a cable 335 that is wound onto the winch 334. The cable is to extend over pulleys 336a, 336b, and has an end secured to the mast 318 so that the mast 318 telescopes as the cable is wound onto, or off the winch 334. In this particular embodiment, the winch 334 is mounted on the mast sleeve 340. In an alternative, the winch may be mounted on a bracket 337 that supports the handle 330.

Figure 16:
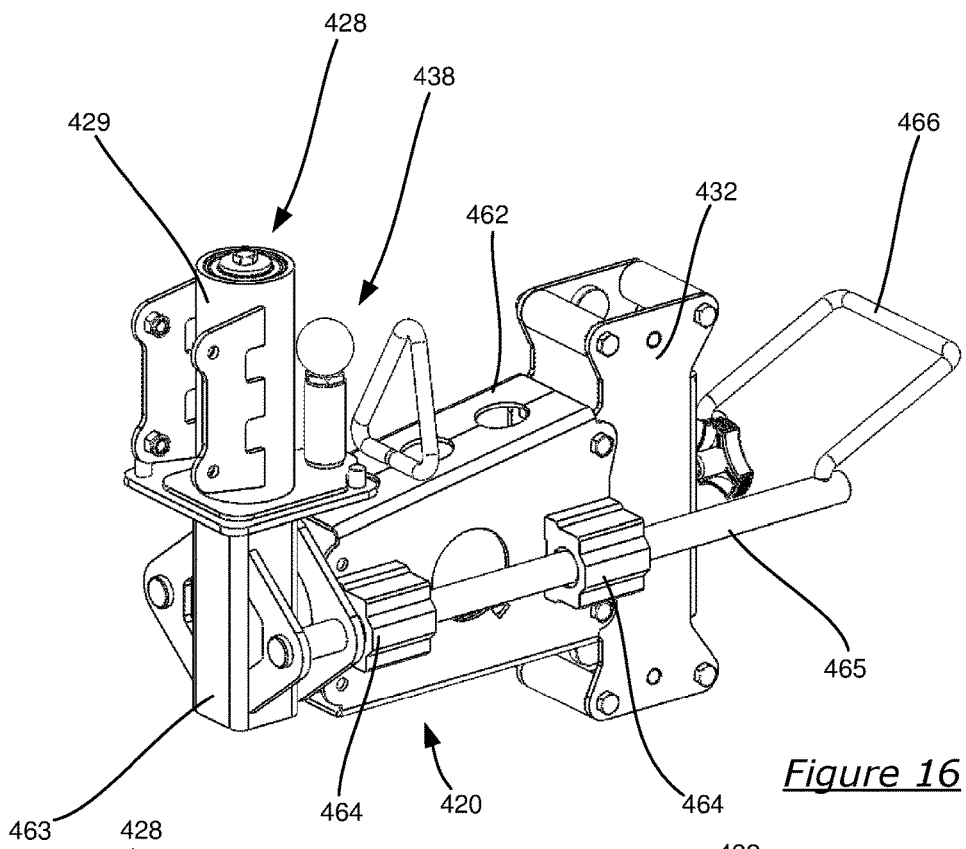
FIG. 16: is a first perspective view of a boom and pivot coupling of a device according to fifth embodiment of the present invention.
Figure 17:
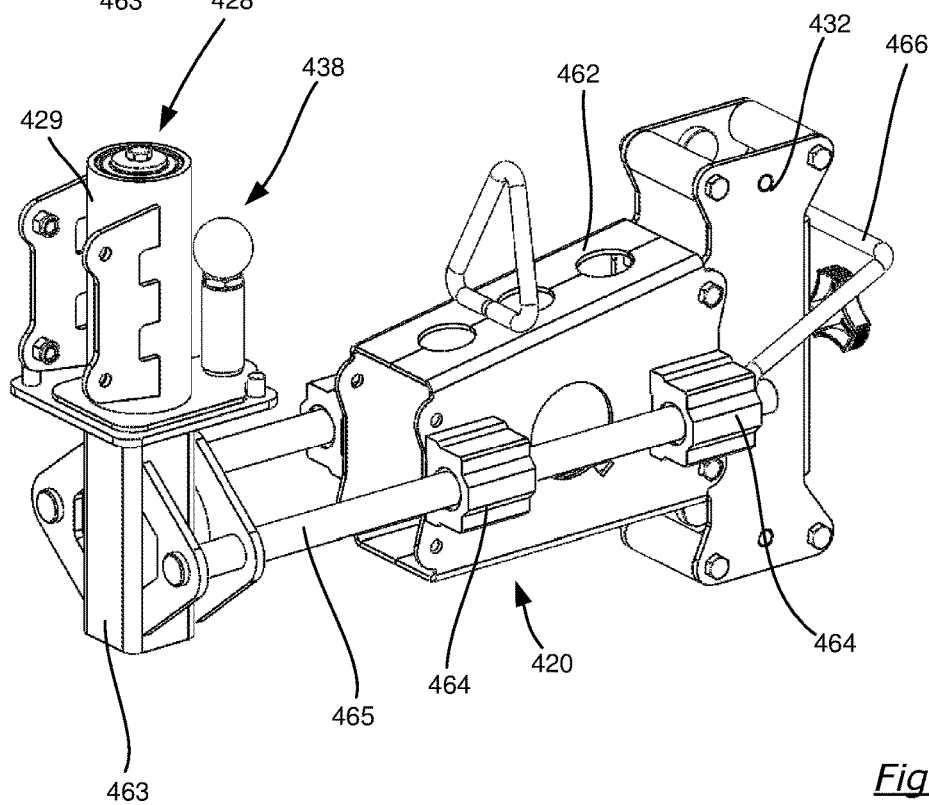
FIG. 17: is a second perspective view of a boom and pivot coupling of FIG. 16.

FIGS. 16 and 17 show carriage 432, boom 420, and pivot 428 of a device according to a fifth embodiment of the present invention. The components shown in FIGS. 16 and 17 are substantially similar to those of the device 10 of FIG. 1. In FIGS. 16 and 17, the components that are substantially similar to those of the device 10 have the same reference numeral with the prefix "4".

The boom 420 includes an inner, fixed portion 462, and an outer movable portion 463, and a slide mechanism between the fixed and movable portions 462, 463, such that the length of the boom 460 (between the carriage 432 and pivot 428) is adjustable. The pivot 428 is mounted on the movable portion 463, and the slide mechanism is arranged such the movable portion 463 can be moved, together with the pivot 428, between an inward position (shown in FIG. 16), and an outward position (shown in FIG. 17).

The fixed portion 462 of the boom 420 is secured to the carriage 432. The slide mechanism includes guides 464 that are mounted on the fixed portion 462, and two rails 465 to which the movable portion 463 is secured. The two rails 465 are arranged with one to each side of the fixed portion 462. The rails 465 can slide through the guides 464 to facilitate the movement of the movable portion 463. The interaction of the guides 464 and rails 465 constrains the movement of the movable portion 463. In this embodiment, the slide mechanism also includes a handle 466 that is connected to the rails 465. An operator of the device can work the handle 466 to move the movable portion 463 between the inward and outward positions.

Figure 18:
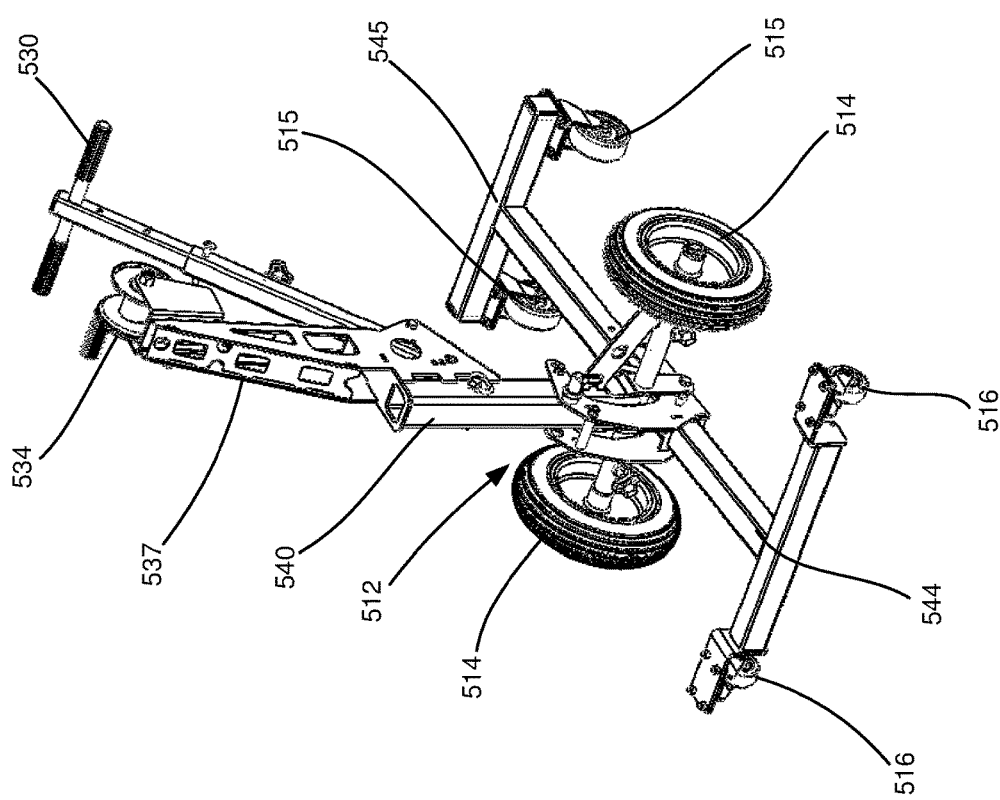
FIG. 18: is a partial perspective view of a device for lifting and transporting sheet material according to a sixth embodiment of the present invention.

FIG. 18 shows a base portion 512 of a device according to a sixth embodiment of the present invention. The device is intended for use in lifting and transporting sheet material, such as a glass pane. The base portion 512 is supported on wheels 514, 515, 516 that are arranged in three sets, and which enable the base portion 512, and thus the device, to be moved across a surface. The device is to also include a mast that extends upwardly from the base portion 512, a boom, and a supporting head, of similar configuration as illustrated and described in connection with other embodiments disclosed herein.

The device further includes a second arm, which in this embodiment is in the shape of a second T-shaped member 545, is securable such that one end of the second T-shaped member 545 is adjacent the bottom end of the mast sleeve 40. Wheels 515, which form a third wheel set, are mounted at the outer end of the T-shaped member 545. Thus, wheels 515 are supported by the second T-shaped member 545 at a position that is spaced from the mast sleeve 540, and also the second sleeve 544.

In the configuration of this particular embodiment, as illustrated in FIG. 18, T-shaped member 544 is to project from the base portion 512 in the same direction as the boom, and the second T-shaped member 545 is to project from the base portion 512 in the same direction as handle assembly 530. As will be appreciated, the third set of wheels 515 provide additional stability to the device in the event when the combined centre of mass of the device and sheet material is close to the wheels 514, or is between wheels 514 and wheels 515.

Figure 19:
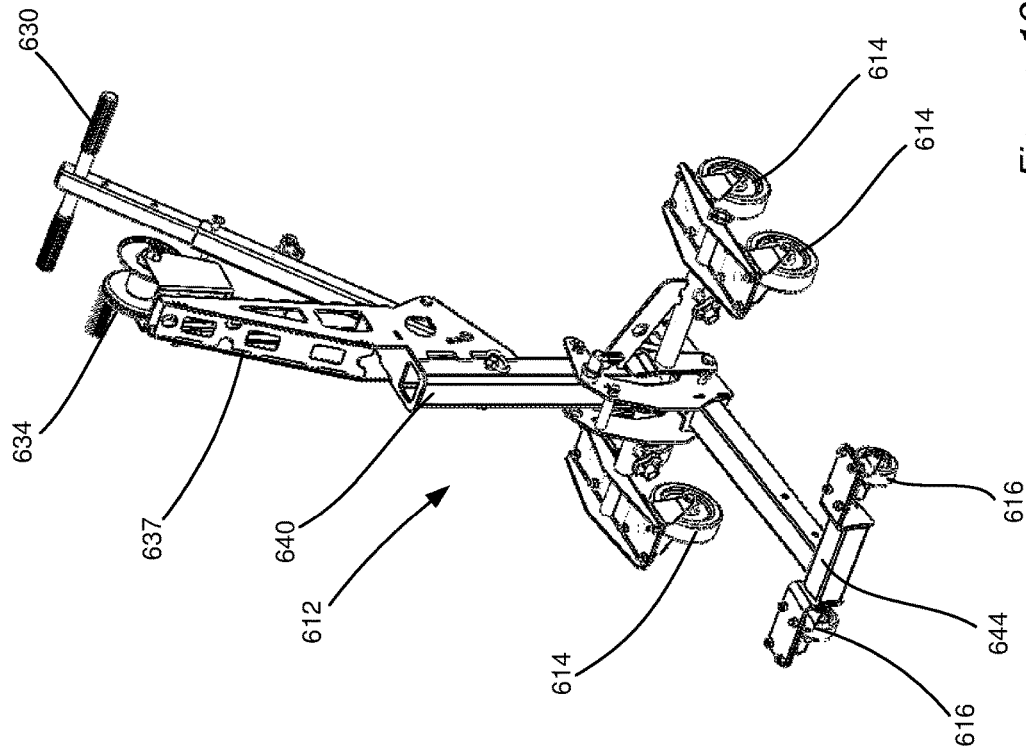
FIG. 19: is a partial perspective view of a device for lifting and transporting sheet material according to a seventh embodiment of the present invention.

FIG. 19 shows a base portion 612 of a device according to a seventh embodiment of the present invention. The device is also intended for use in lifting and transporting sheet material, such as a glass pane. The base portion 612 is supported on two sets of wheels 614, 616. The device is to also include a mast that extends upwardly from the base portion 612, a boom, and a supporting head, of similar configuration as illustrated and described in connection with other embodiments disclosed herein.

The base portion 612 is substantially similar to the base portion of the device 10, but differs in that the first set of wheels consists of four castor wheels 614 that are disposed with in pairs to each side of the mast sleeve 640. The use of castor wheels 614, 616 facilitates additional manoeuvrability, particularly when the device is to be shifted laterally with respect to the handle 630 and mast sleeve 640.

Figure 20:
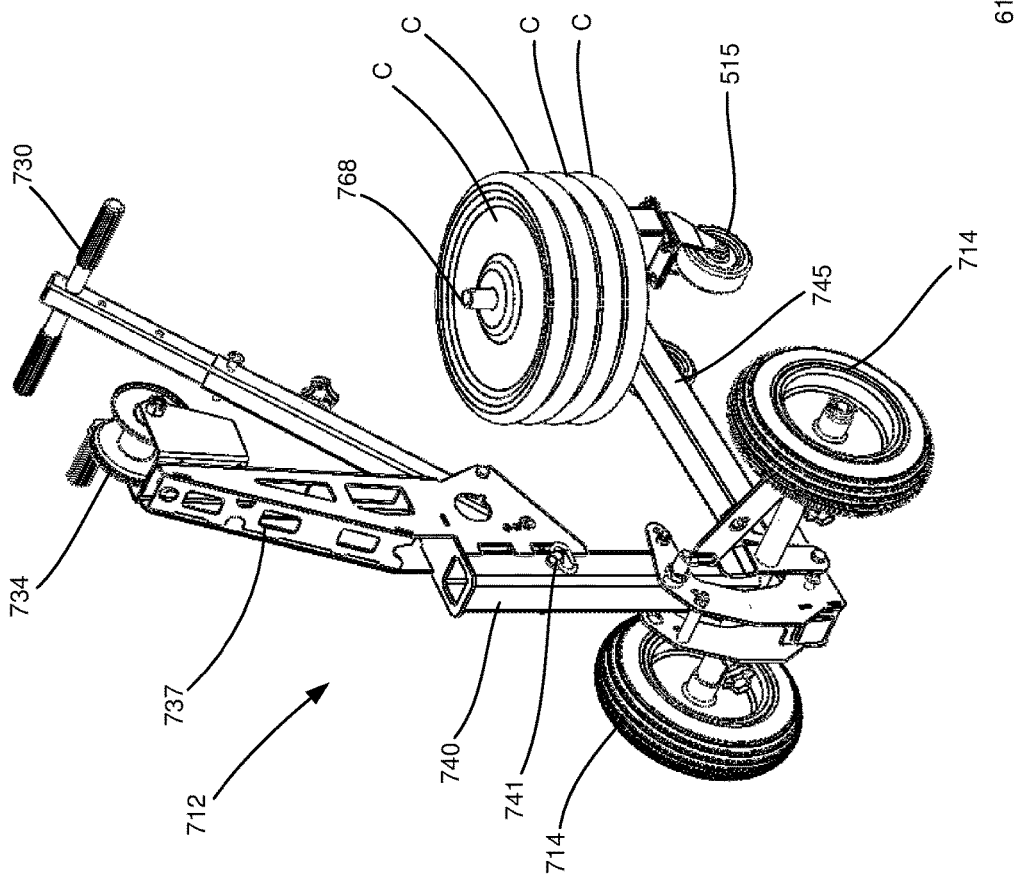
FIG. 20: is a partial perspective view of a device for lifting and transporting sheet material according to an eighth embodiment of the present invention.

FIG. 20 shows a base portion 712 of a device according to an eighth embodiment of the present invention. The device is also intended for use in lifting and transporting sheet material, such as a glass pane. The base portion 712 is supported on two sets of wheels 714, 715. The device is to also include a mast that extends upwardly from the base portion 712, a boom, and a supporting head, of similar configuration as illustrated and described in connection with other embodiments disclosed herein.

The base portion 712 is substantially similar to the base portion 512 illustrated in FIG. 18. However, the base portion 712 only has a T-shaped member 745 and wheels 715 that are to project from the base portion 712 in the same direction as handle assembly 730. As is evident from FIG. 20, the base portion 712 does not include an arm and wheels that extend from the mast sleeve 740 in the same direction as the boom. To counteract the weight of the sheet material supported by the supporting head forwardly of the first set of wheels 714, the T-shaped member 745 includes a post 768. Counterweights C, which in this embodiment are in the form of discs that each have a central aperture, are located on the post 768. An advantage of this arrangement is that the device can be moved with the supported sheet material up to the perimeter of a raised slab or floor while mounting the sheet material at the perimeter.

Figure 21:
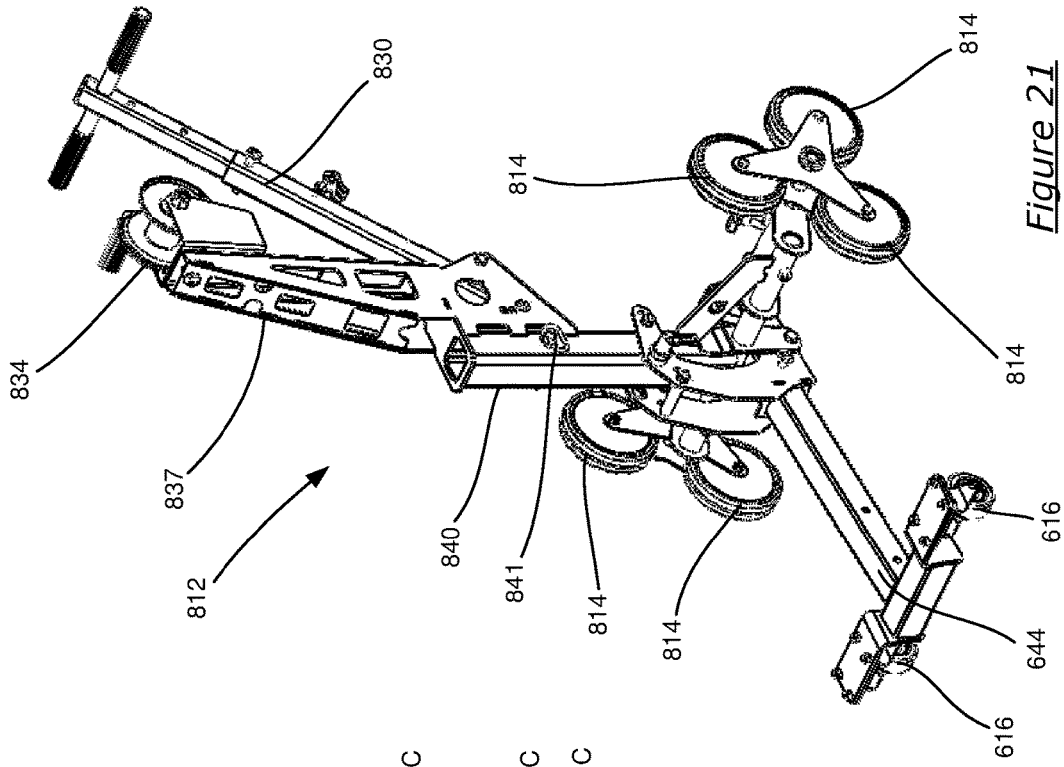
FIG. 21: is a partial perspective view of a device for lifting and transporting sheet material according to a ninth embodiment of the present invention.

FIG. 21 shows a base portion 812 of a device according to a ninth embodiment of the present invention. The device is also intended for use in lifting and transporting sheet material, such as a glass pane. The base portion 812 is supported on two sets of wheels 814, 816. The device is to also include a mast that extends upwardly from the base portion 812, a boom, and a supporting head, of similar configuration as illustrated and described in connection with other embodiments disclosed herein.

The base portion 812 is substantially similar to the base portion of the device 10, but differs in that the first set of wheels consists of six wheels 814 that are disposed with three wheels 814 to each side of the mast sleeve 840 in a tri-star wheel configuration. The use of wheels 814 in the tri-star wheel configuration facilitates movement of the device over uneven ground, including up and down stair cases.

Figure 22:
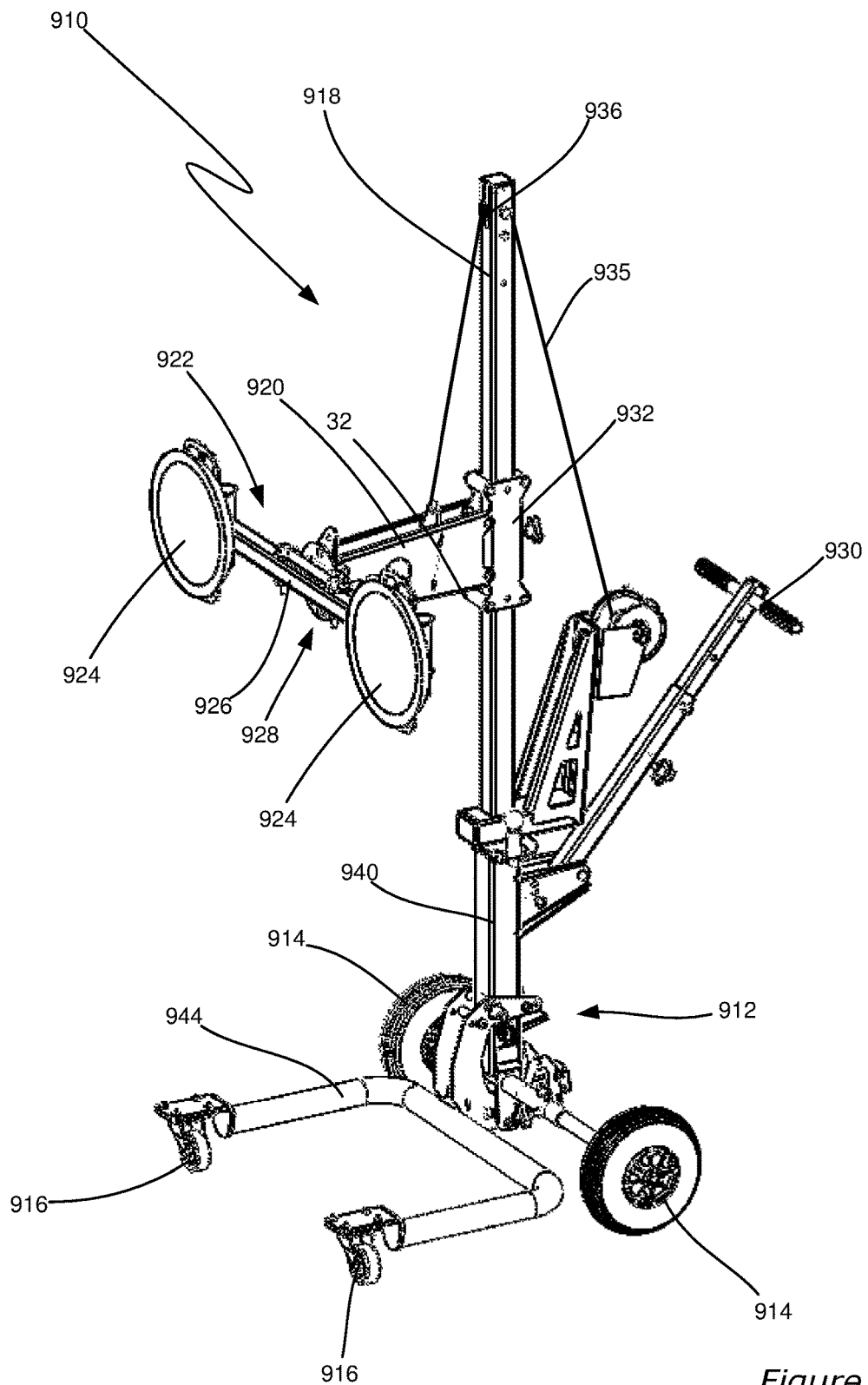
FIG. 22: is a perspective view of a device for lifting and transporting sheet material according to a tenth embodiment of the present invention.

FIG. 22 shows a device 910 according to a tenth embodiment of the present invention. The device 910 is substantially similar to the device 10 of FIG. 1. In FIG. 22, the features of the device 910 that are substantially similar to those of the device 10 have the same reference numeral with the prefix "9".

The principal difference between the devices 10, 910 is that in the device 910, the arm on which wheels 916 are mounted is the form of a U-shaped member 944. With this embodiment, the base portion 912 can more readily be brought up to a glass storage trolley such that the wheels 916 are underneath the platform of the trolley, and the U-shaped member 944 extending around a wheel of that trolley.

FIGS. 23 and 24 show a device 1010 according to an eleventh embodiment of the present invention. The device 1010 is substantially similar to the device 10 of FIG. 1. In FIGS. 23 and 24, the features of the device 1010 that are substantially similar to those of the device 10 have the same reference numeral with the prefix "10".

The principal difference between the devices 10, 1010 is that in the device 1010, the supporting head 1022 includes a single vacuum grip 1024 and a pair of L-shaped feet 1025.

The vacuum grip 1024 and feet 1025 co-operate to support a sheet material, such as plasterboard, or a door, or the like.

The supporting head 1022 is adjustable, such that the height of the vacuum grip 1024 above the boom 1020 can be adjusted. Similarly, the distance of the feet 1025 below the boom 1020 can also be adjusted.

FIGS. 25 and 26 show a device 1210 according to a twelfth embodiment of the present invention. The device 1210 is substantially similar to the device 10 of FIG. 1. In FIGS. 25 and 26, the features of the device 1210 that are substantially similar to those of the device 10 have the same reference numeral with the prefix "12".

The principal difference between the devices 10, 1210 is that in the device 1210, the boom 1220 includes a parallelogram linkage between the inner and outer ends. Accordingly, the outer end of the boom 1220, including the pivot 1228 can be moved along an arc A that is centred on the inner end. The arc A is indicated in FIG. 25 by double headed broken arrow.

The device 1210 also includes a gas strut that extends between the carriage 1232 and an outer end of the boom 1230 to provide a force to lift the supporting head 1222 upwardly along the arc A. The linkage provides the advantage of being able to move outer end of the boom 1220 inwardly and outwardly relative to the mast 1218.

Figure 27:
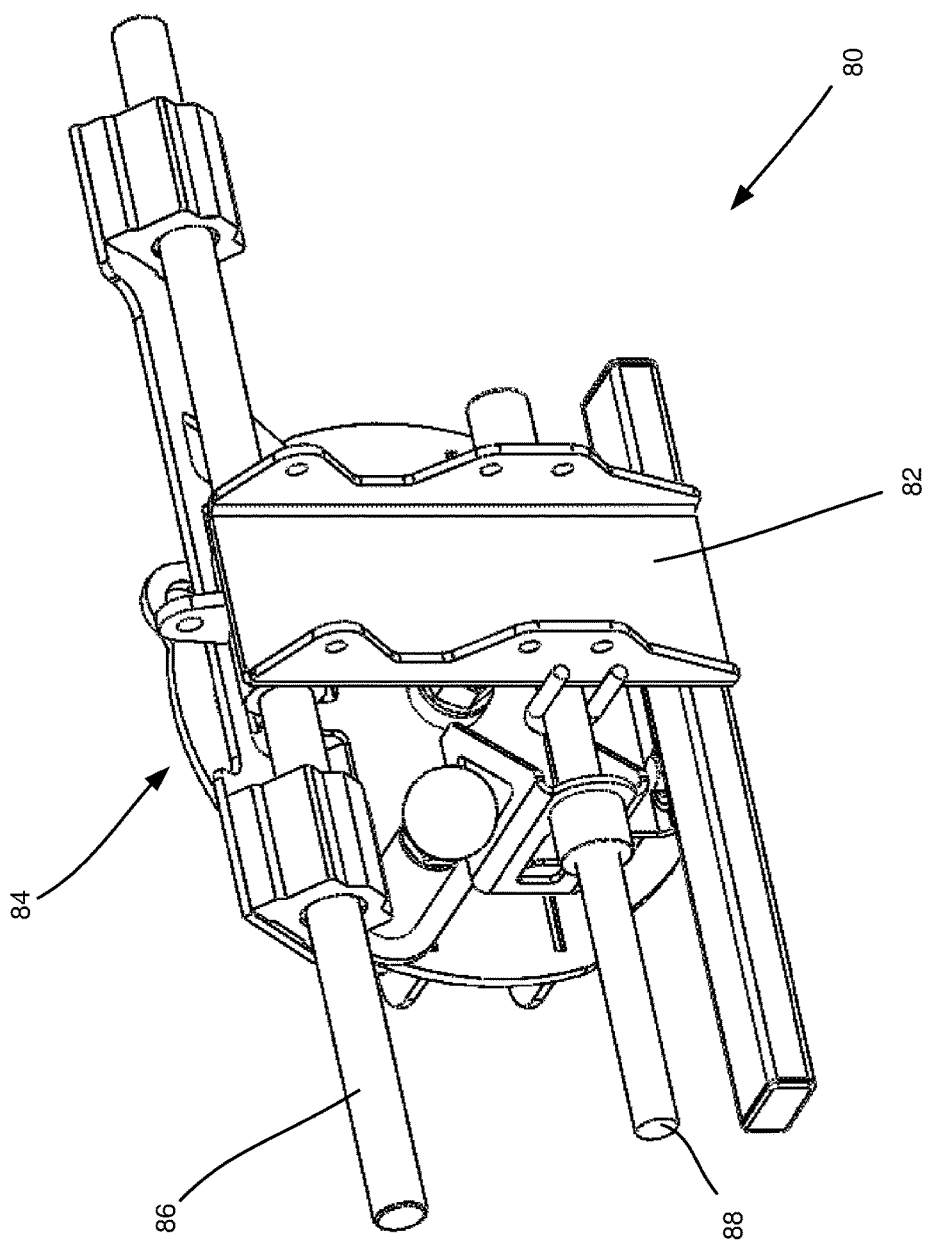
FIG. 27: is a rear perspective view of a side shift mechanism for use in a device for lifting and transporting sheet material.

FIG. 27 is a rear view of a side shift mechanism 80 that can be disposed between the mast and the inner end of the boom in an embodiment of a device for lifting and transporting sheet material in accordance with the present invention. The side shift mechanism 80 has a first bracket 82 for mounting the mechanism 80 to the mast, and a second bracket 84 to which the boom or supporting head can be mounted. The mechanism 80 is arranged to move the boom and/or supporting head in a direction that is transverse to the longitudinal direction of the mast. To this end, the second bracket 84 is mounted on a sliding rail 86 and a threaded bar 88. The threaded bar 88 is rotatable to slide the second bracket 84 relative to the first bracket along the sliding rail 86.

Figure 28:
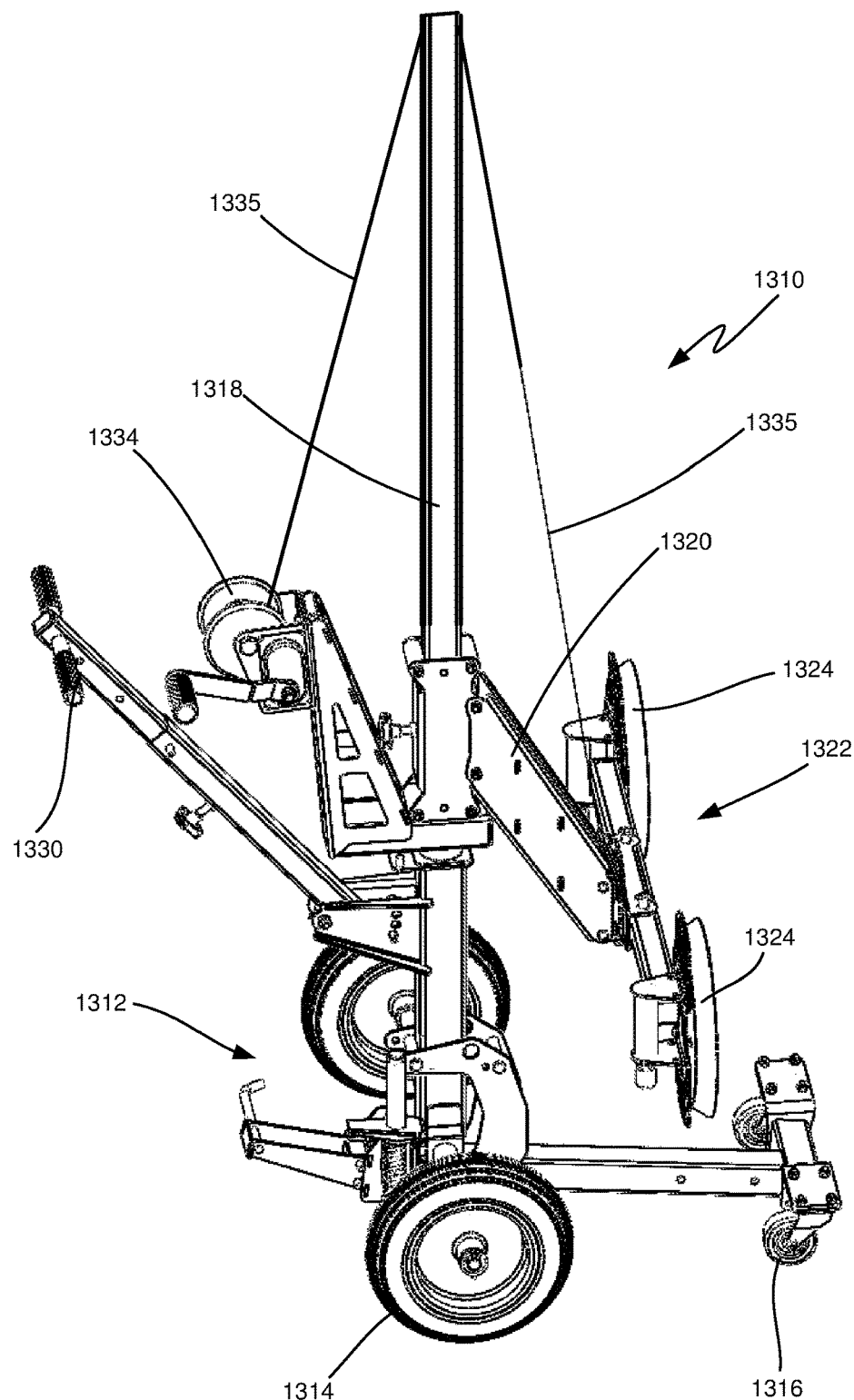
FIG. 28: is a perspective view of a device for lifting and transporting sheet material according to a thirteenth embodiment of the present invention.

FIG. 28 shows a device 1310 according to a thirteenth embodiment of the present invention. The device 1310 is substantially similar to the device 10 of FIG. 1. In FIG. 28, the features of the device 1310 that are substantially similar to those of the device 10 have the same reference numeral with the prefix "13".

The principal difference between the devices 10, 1310 is that in the device 1310, the boom 1320 inclined such that the outer end is either above or below the first end. In the configuration illustrated in FIG. 28, the boom 1320 can be secured in a first position in which the outer end, and thus the supporting head 1322, is below the carriage 1332. The boom 132 can be detached from the carriage 1332 and supporting head 1322, and then reattached in a second position in which the outer end, and thus the supporting head 1322, is above the carriage 1332. The inclined boom 1320 enables the lift sheet material from/to a position below the bottom of the mast 1318. Alternatively, the inclined boom 1320 enables the lift sheet material from/to a position above the top of the mast 1318.

FIGS. 29 to 33 show a device 1410 according to a fourteenth embodiment of the present invention. The device 1410 is intended for use in lifting and transporting sheet material, such as a glass pane G. In FIGS. 29 to 33, the components that are substantially similar to those of the device 10 have the same reference numeral with the prefix "14".

The lifting mechanism of this embodiment, includes a winch 1434, and a cable 1435 that is wound onto the winch 1434. The cable 1435 passes over a first pulley 1436a located at or near the upper end of the mast 1418 and under a second pulley 1436b that is located within the boom 1420, and is secured to a bracket 1439 that is located at or near the upper end of the mast 1418. The inclusion of the second pulley 1436b in the lifting mechanism provides further mechanical advantage to the lifting mechanism. In one example, the lifting mechanism of this embodiment can lift a glass pane G that weighs in excess of 150 kg.

Figure 31:
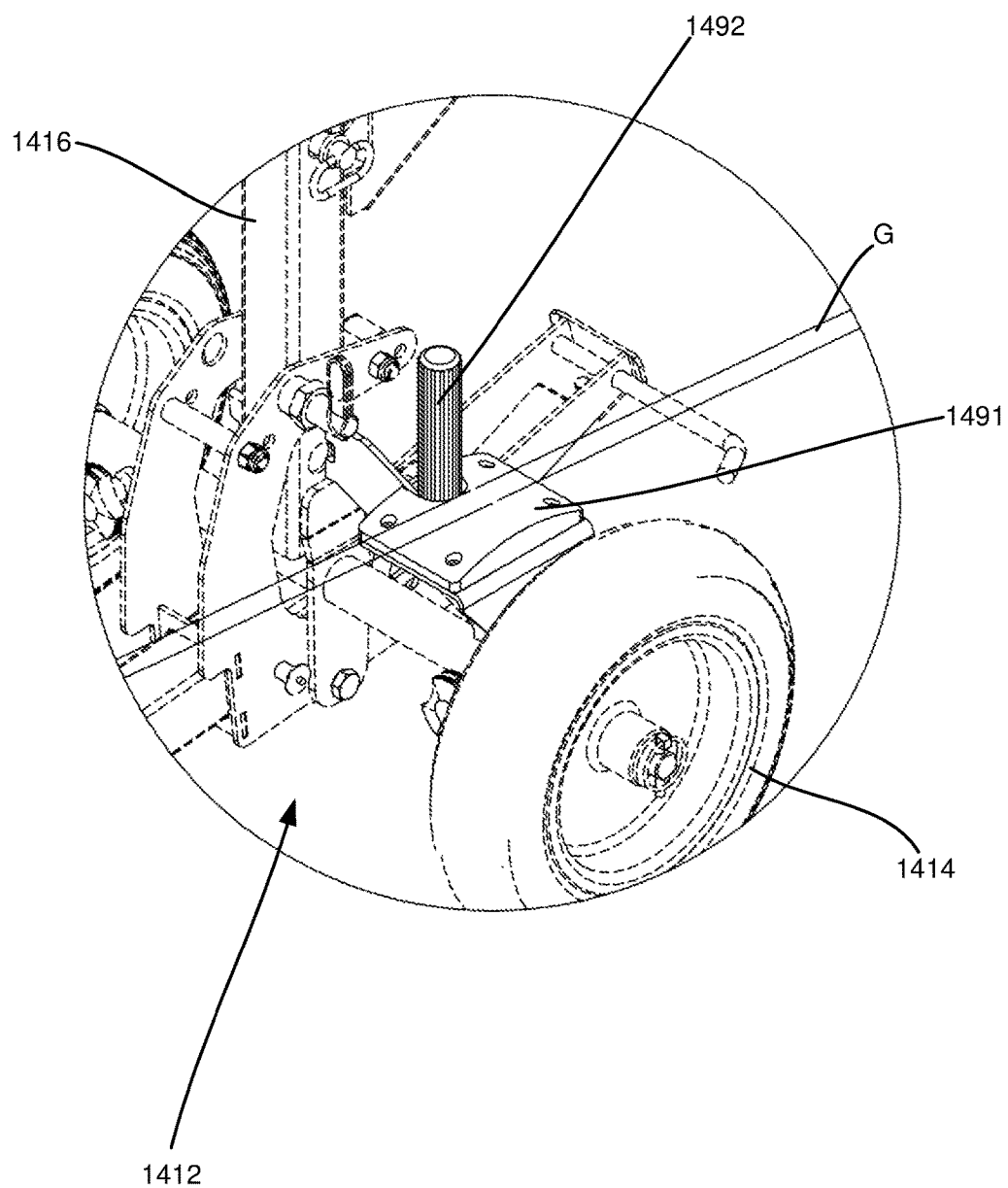
FIG. 31: is an enlarged view of region A in FIG. 29.

As shown more clearly in FIG. 31, the base portion 1412 of this embodiment includes a secondary support 1490, which is disposed between one of the rear wheels 1414, and the mast 1418. The secondary support 1490 has a shelf member 1491 and a peg 1492 that is positioned to extend upwardly from an inner side of the shelf member 1491. As indicated in FIG. 31, a glass pane G that is being supported by the supporting head 1422 in the second position can be lowered onto the shelf member 1491 of the secondary support 1490. In this way, movement of the bottom edge of the glass pane G can be prevented, which improves the stability of the device 1410 while transporting the glass pane G.

The device 1410 has a first pivot coupling 1428 that is substantially similar to that of the pivot coupling 28 of the device 10, and a first retaining mechanism 1438 that is substantially similar to that of the retaining mechanism 38 of the device 10. In addition, the device 1410 has a rotary coupling 1452 and second retaining mechanism 1453 that is substantially similar to the rotary coupling 152 and second retaining mechanism 153 shown in FIGS. 11 to 13.

Figure 32:
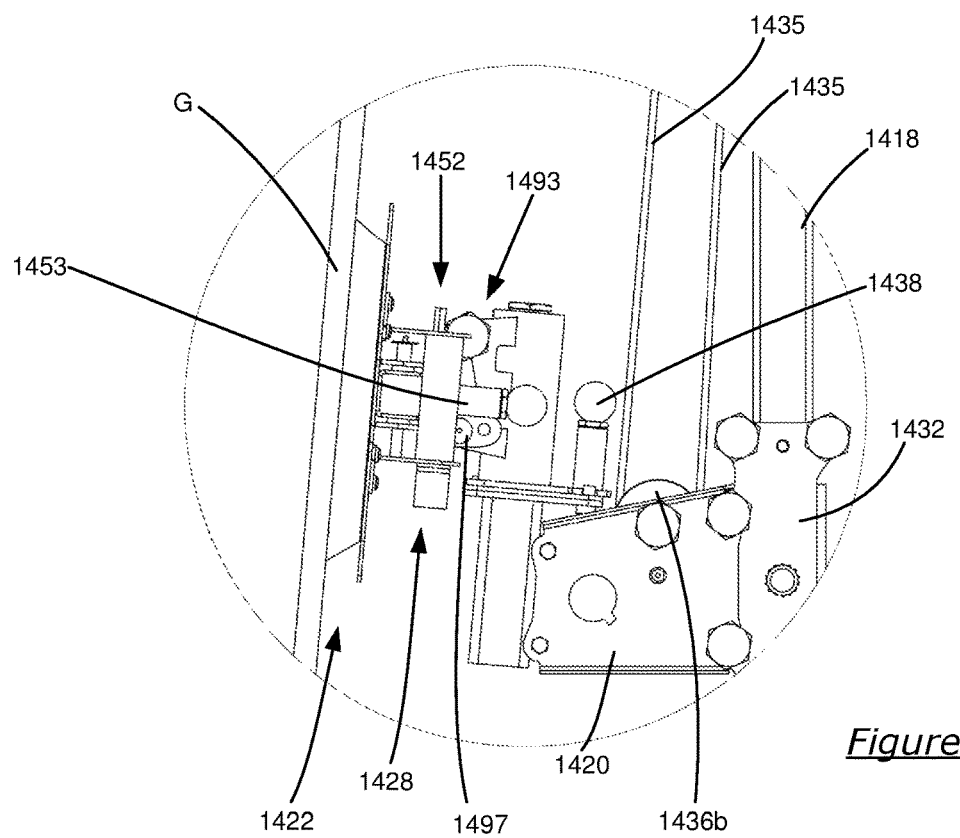
FIG. 32: is an enlarged view of region B in FIG. 30, showing the supporting head in an upright position.
Figure 33:
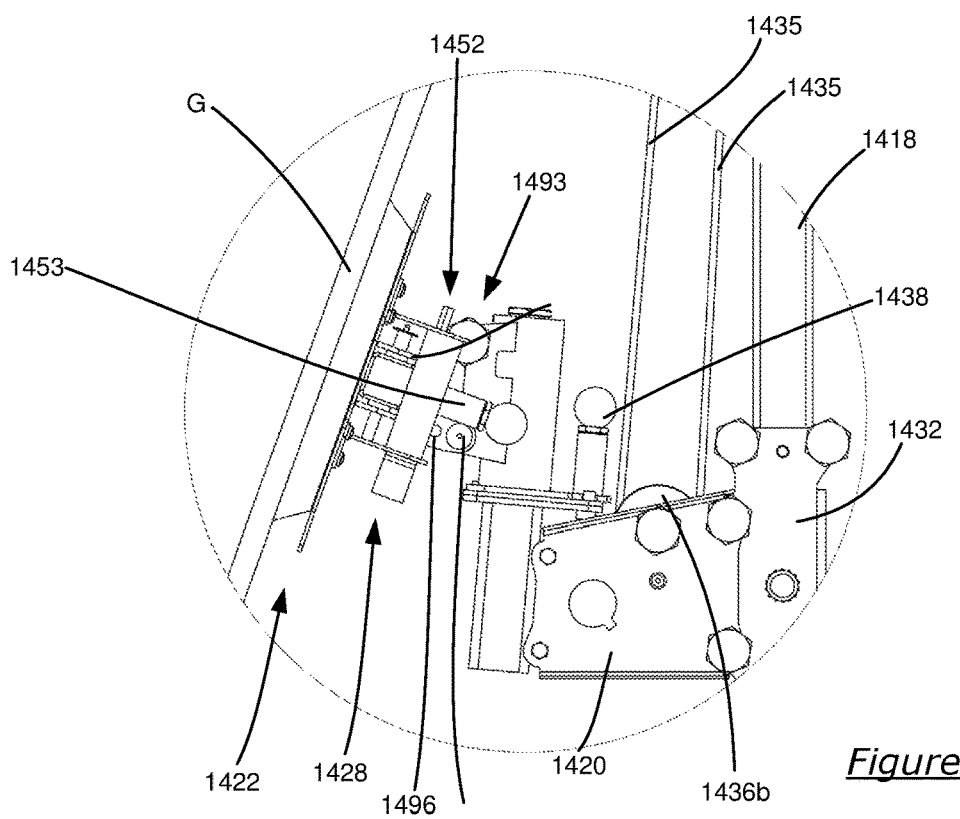
FIG. 33: is an enlarged view of region B in FIG. 30, showing the supporting head in a tilted position.

The device 1410 of this embodiment additionally includes a second pivot coupling 1493. As is evident from FIGS. 32 and 33, the second pivot coupling 1493 allows the supporting head 1422 to be tilted about an axis that is transverse to the generally vertical pivot axis. The second pivot coupling 1493 is configured to enable the supporting head 1422 to be placed in an upright position, in which the glass pane G is approximately vertical, as shown in FIG. 32. Further, the second pivot coupling 1493 is configured to enable the supporting head 1422 to be placed in a tilted position, as shown in FIG. 33. In the tilted position, the glass pane G is positioned with the bottom edge further from the mast than the top edge. Placing the supporting head 1422 in the tilted position can be advantageous during installation of a glass pane in an opening. A third retaining mechanism is associated with the second pivot coupling 1493, and is configured to enable the supporting head to be releasably retained in either or both of the upright or tilted positions.

In this particular embodiment, the second pivot coupling 1493 includes a first bracket 1495 that is fixedly attached to the tube 1429 of pivot coupling 1428, and a second bracket 1496 that is attached to the supporting head 1422. A bolt 1497 passes through aligned upper holes in each of the first and second brackets 1495, 1496, to pivotally connect these brackets. The first bracket 1495 has a pair of lower holes in the lower portion, and the second bracket 1496 has two pairs of lower holes in the lower portion.

When the supporting head 1422 is in the upright position, one of the pairs of lower holes in the second bracket 1497 aligns with the pair of lower holes in the first bracket 1496. A slide pin 1497 is passed through the aligned lower holes to retain the supporting head 1422 in the upright position. Similarly, when the supporting head 1422 is in the tilted position, the other of the pairs of lower holes in the second bracket 1497 aligns with the pair of lower holes in the first bracket 1496. The slide pin 1497 is passed through the aligned lower holes to retain the supporting head 1422 in the tilted position.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The invention claimed is:

1. A device for lifting and transporting sheet material, the device comprising:
   a base portion including a mast sleeve;
   wheels on which the base portion is supported, such that the device is movable across a surface, the wheels including a first wheel set that supports the base portion at a bottom end of the mast sleeve and includes at least two wheels positioned at sides of the mast sleeve opposite from one another, the at least two wheels of the first wheel set independently rotatable about a common axis;
   a mast including a bottom end retained within the mast sleeve, the mast extending upwardly from the base portion;
   a carriage configured to slide along the mast;
   a boom that extends outwardly from a first end to a second end, the first end of the boom mounted on the carriage;
   a lifting mechanism to provide vertical support to the boom along the mast;
   a supporting head configured to support sheet material above the surface;
   a pivot coupling at the second end of the boom, the pivot coupling arranged to couple the supporting head to the boom, and enable the supporting head to rotate about a pivot axis between a first position in which the sheet material supported by the supporting head is in a generally transverse orientation relative to the boom, and a second position in which an angle between the sheet material supported by the supporting head and the boom is reduced; and
   a retaining mechanism adapted to releasably retain the supporting head in the first position, wherein the retaining mechanism includes:
   a first plate fixedly attached to the boom adjacent the pivot coupling, the first plate including two spaced apart holes;
   a second plate movable with the pivot coupling about the pivot axis; and
   a drop pin that moves with second plate, wherein when the supporting head is in the first position, the drop pin can be passed through a hole in the first plate to retain the supporting head in the first position.

2. A device according to claim 1, wherein the pivot coupling includes a pin attached to one of the boom and the supporting head, and a tube attached to the other of the supporting head and the boom, and wherein the tube is rotatably supported on the pin.

3. A device according to claim 1, wherein the pivot coupling includes:
   a pair of brackets that each have one or more apertures, each bracket mounted to a respective one of the boom and the supporting head; and
   a pin, wherein the apertures in the brackets are aligned and the pin passes through the aligned brackets to couple the brackets to one another.

4. A device according to claim 1, wherein the supporting head includes an inner portion attached to the pivot coupling, an outer portion including one or more elements that support the sheet material, and a rotary coupling that couples the inner and outer portions such that the outer portion is rotatable relative to the inner portion about an axis that is non-parallel to the pivot axis.

5. A device according to claim 4, further comprising a second retaining mechanism such that the outer portion can be releasably retained in one or more rotational positions relative to the inner portion.

6. A device according to claim 1, wherein the mast is movable relative to the mast sleeve between a lowered position and a raised position.

7. A device according to claim 6, wherein the mast can be secured in each of the lowered and raised positions.

8. A device according to claim 6, wherein the mast sleeve includes one or more through holes, and the mast includes upper and lower holes, and wherein each of the upper and lower holes can be aligned with the through holes and a pin passed through the aligned holes to secure the mast relative to the mast sleeve.

9. A device according to claim 1, wherein the boom includes a slide mechanism between the first and second ends to adjust a length of the boom.

10. A device according to claim 9, wherein the slide mechanism is arranged so the outer end is movable between an inward position and an outward position.

11. A device according to claim 10, wherein the boom includes an inner fixed portion, and an outer movable portion, and the slide mechanism is disposed between the fixed and movable portions.

12. A device according to claim 11, wherein the slide mechanism includes guides mounted on the fixed portion, and one or more rails to which the movable portion is secured, wherein the rails can slide through the guides to facilitate the movement of the movable portion.

13. A device according to claim 1, wherein the lifting mechanism includes a winch, and a cable connected to the winch passes over a first pulley located at or near the upper end of the mast and under a second pulley supported by the boom, and the cable is secured or securable at or adjacent an upper end of the mast.

14. A device according to claim 1, wherein the lifting mechanism includes a winch, and a cable that is connected to the winch extends over a pulley located at or near the upper end of the mast, and the cable is secured or securable to the boom.

15. A device according to claim 1, wherein the mast sleeve is offset relative to the at least two wheels of the first wheel set, such that the mast is horizontally closer to one of the at least two wheels in the first wheel set than the other.

16. A device according to claim 15, wherein the base portion includes a secondary support disposed between one of the at least two wheels in the first wheel set and the mast sleeve, whereby, when the supporting head is in the second position, the carriage can be lowered along the mast to bring the sheet material supported by the supporting head in contact with the secondary support.

17. A device according to claim 1, wherein a longitudinal direction of the mast sleeve and the common axis of the first wheel set are co-planar.

18. A device for lifting and transporting sheet material, the device comprising:
   a base portion including a mast sleeve;
   wheels on which the base portion is supported such that the device is movable across a surface, the wheels including a first wheel set that supports the base portion at a bottom end of the mast sleeve and includes at least two wheels positioned at sides of the mast sleeve opposite from one another, the at least two wheels of the first wheel set independently rotatable about a common axis;

a mast including a bottom end retained within the mast sleeve, the mast extending upwardly from the base portion;

an assembly that is displaceable along the mast, the assembly including a supporting head configured to support sheet material above the surface, and a carriage sub-assembly to guide movement of the assembly along the mast, the carriage sub-assembly including a pivot coupling that couples the supporting head to the carriage sub-assembly, and enables the supporting head to rotate about a pivot axis between a first position in which the sheet material supported by the supporting head is in a generally parallel orientation relative to the common axis, and a second position in which the sheet material supported by the supporting head is transverse to the common axis;

a retaining mechanism configured to releasably retain the supporting head in the first position, the retaining mechanism including a first plate that is fixedly attached to the boom adjacent the pivot coupling and includes two spaced apart holes, a second plate that is movable with the pivot coupling about the pivot axis, and a drop pin that moves with second plate, wherein when the supporting head is in the first position, the drop pin can be passed through a hole in the first plate to retain the supporting head in the first position; and a lifting mechanism to provide vertical support to the assembly along the mast.

19. A device according to claim 18, wherein the carriage sub-assembly includes a boom to which the pivot coupling is connected, and wherein the boom spaces the pivot coupling from the mast.

20. A device according to claim 19, wherein the carriage sub-assembly includes a carriage, and the boom is mounted on the carriage.

21. A device according to claim 18, wherein a longitudinal direction of the mast sleeve and the common axis of the first wheel set are co-planar.

* * * * *